United States Patent
Ngai et al.

(10) Patent No.: US 6,574,717 B1
(45) Date of Patent: Jun. 3, 2003

(54) TECHNIQUES FOR TIME-BASED RETENTION OF A REUSABLE RESOURCE

(75) Inventors: Gary Ngai, Saratoga, CA (US); Amit Ganesh, San Jose, CA (US); Jonathan Klein, Redwood City, CA (US); Sujatha Muthulingam, Campbell, CA (US)

(73) Assignee: Oracle Corporation, Redwood Shores, CA (US)

( * ) Notice: Subject to any disclaimer, the term of this patent is extended or adjusted under 35 U.S.C. 154(b) by 211 days.

(21) Appl. No.: 09/872,267

(22) Filed: May 31, 2001

(51) Int. Cl.[7] .............................................. G06F 13/00
(52) U.S. Cl. ..................... 711/147; 711/156; 711/166
(58) Field of Search ......................... 74/147, 156, 166

(56) References Cited

U.S. PATENT DOCUMENTS

| | | | | |
|---|---|---|---|---|
| 5,524,205 A | * | 6/1996 | Lomet et al. | 714/16 |
| 5,990,906 A | * | 11/1999 | Hudson et al. | 345/666 |
| 6,295,610 B1 | * | 9/2001 | Ganesh et al. | 714/19 |
| 6,374,264 B1 | * | 4/2002 | Bohannon et al. | 707/202 |

* cited by examiner

*Primary Examiner*—Reba I. Elmore
(74) *Attorney, Agent, or Firm*—Hickman Palermo Truong & Becker LLP; Brian D. Hickman

(57) ABSTRACT

Techniques for managing, within a computer system, a resource that is reusable by a plurality of entities include establishing a minimum period of time for retaining an amount of the resource after completion of use of the resource by an entity. A first amount of the resource is allocated to a first entity. After allocating the first amount to the first entity, the first amount is prevented from being allocated to a second entity before the minimum period of time expires after the first entity completes use of the first resource. These techniques allow resources to be recycled and allocated for new uses by other entities in a computer system, but also guarantee the resources are retained in a given state for consistent use by other entities, even after the entity terminates that first had the resource allocated.

45 Claims, 16 Drawing Sheets

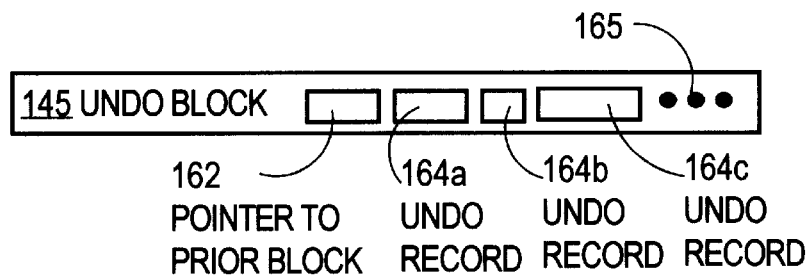
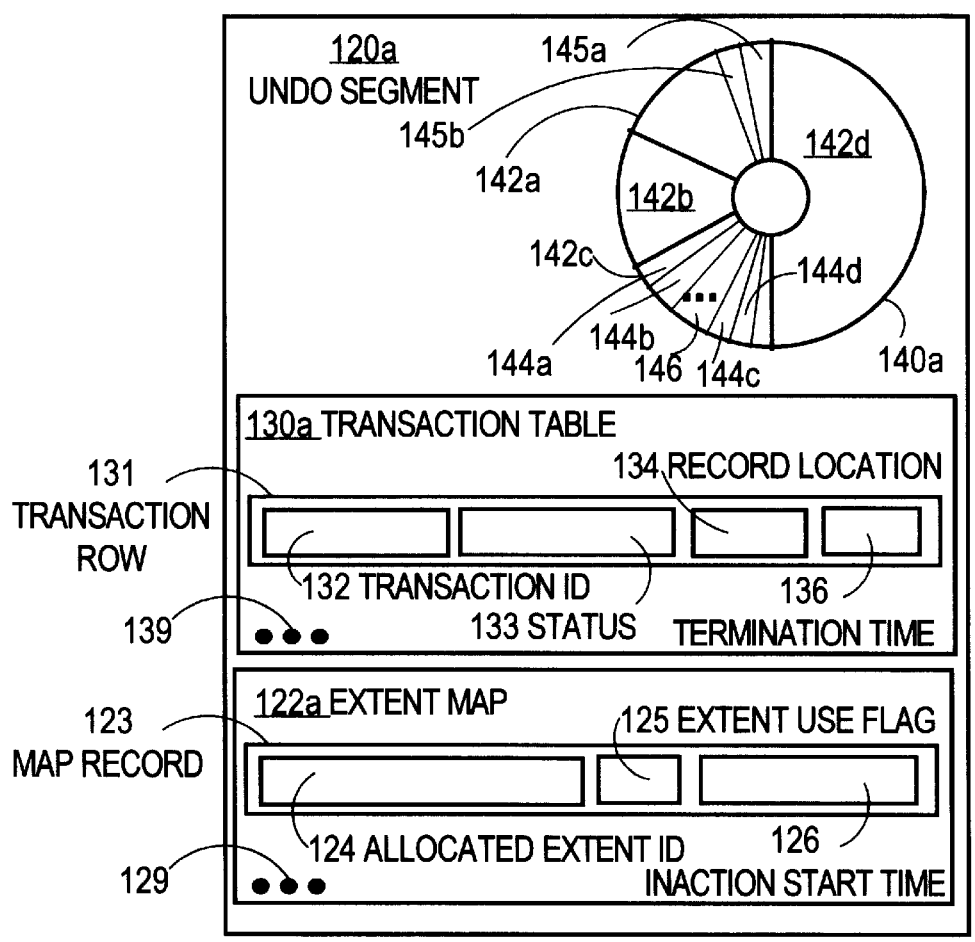

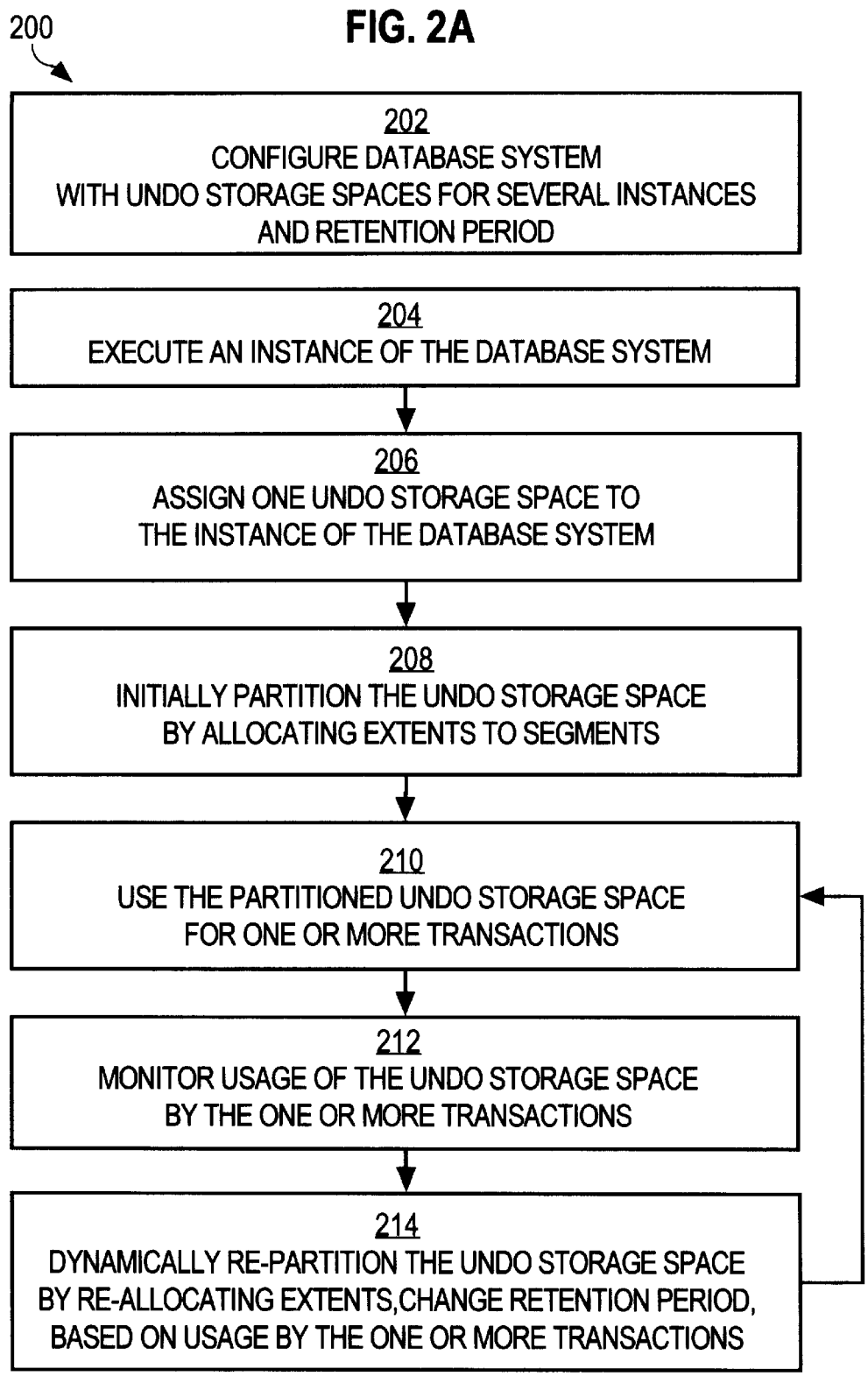

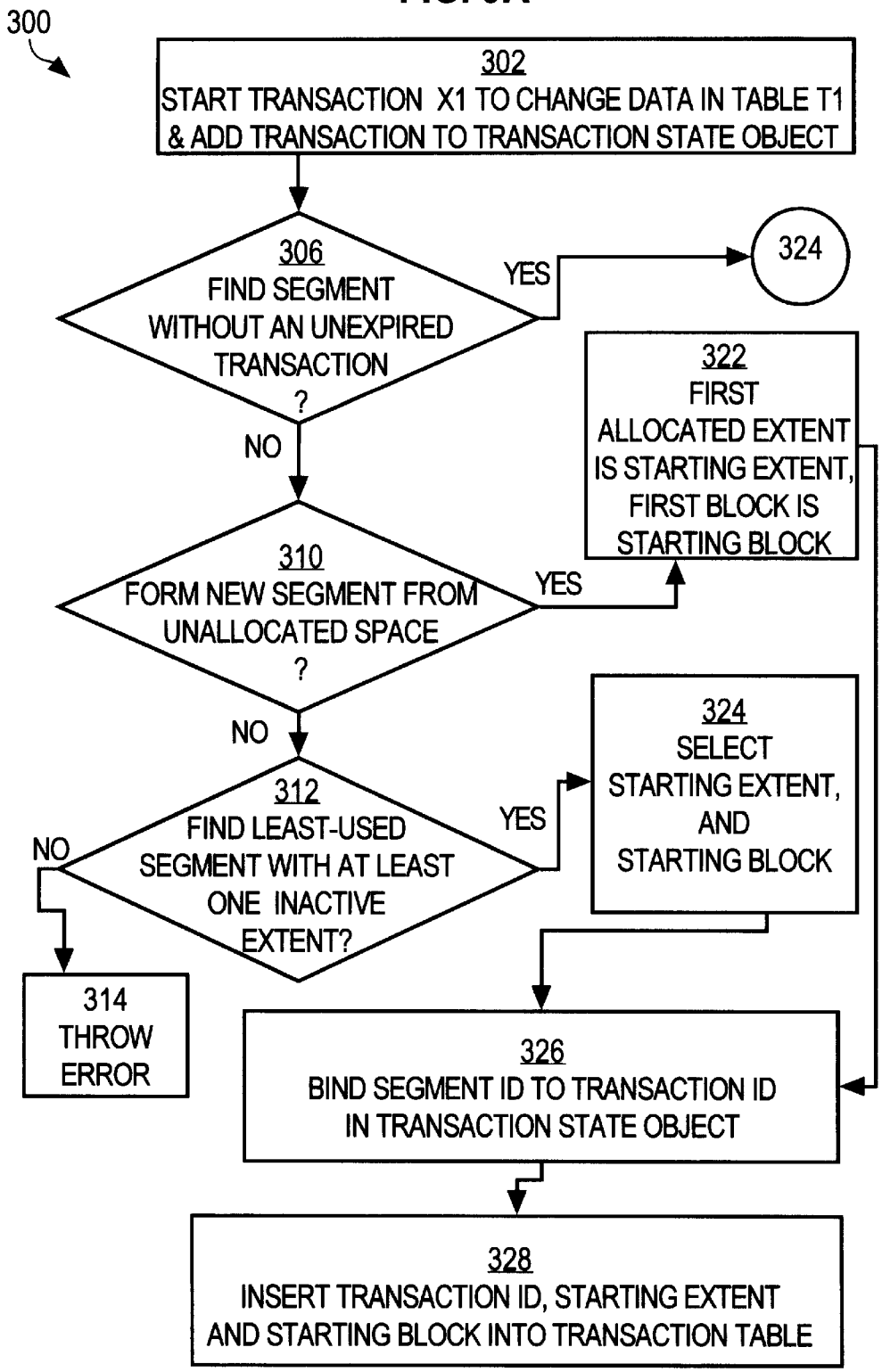

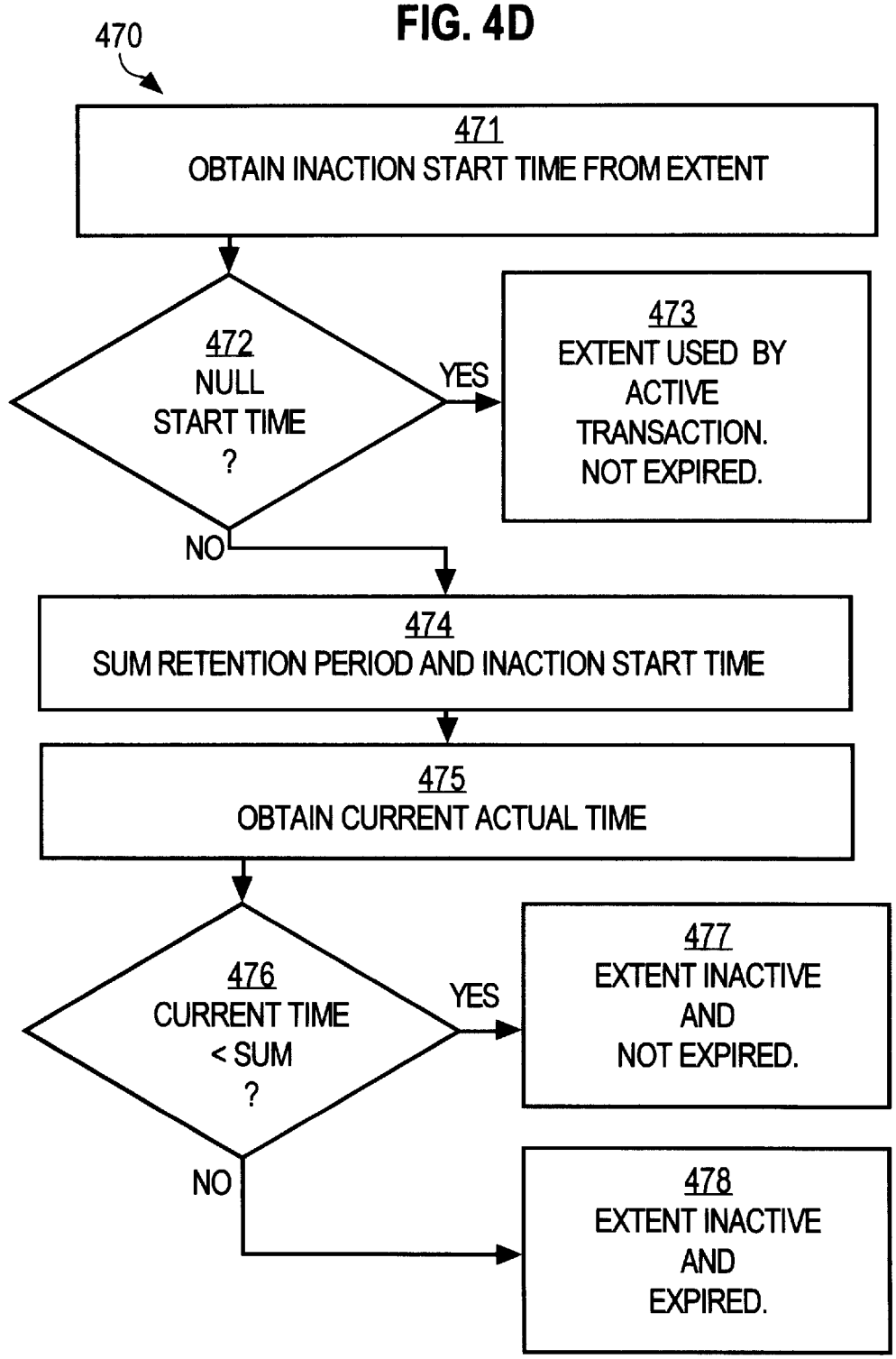

TECHNIQUES FOR TIME-BASED RETENTION OF A REUSABLE RESOURCE

CROSS REFERENCE TO RELATED APPLICATIONS

This application is related to U.S. patent application Ser. No. 09/872,243, filed May 31, 2001, entitled "Dynamic Partitioning of a Reusable Resource," by Gary Ngai, Amit Ganesh, Jonathan Klein and Sujatha Muthulingam.

FIELD OF THE INVENTION

The present invention relates to managing a limited resource that is reusable by multiple entities within a computer system. In particular, the present invention is directed to retaining an amount of the resource used by an entity for a minimum period of time after the entity terminates execution.

BACKGROUND OF THE INVENTION

Computer systems include computer hardware, such as one or more processors and one or more storage devices, and software entities made up of instructions for causing the processors to perform one or more related tasks. Limits on the amount of resources in the computer system have impacts on the software systems executing on the hardware to perform the related tasks. For example, the amount of memory limits how much data a processor can access quickly; the amount of durable storage limits the amount of data that can be stored in a database; and the communications bandwidth limits the number and size of messages that can be exchanged with other devices connected to the computer.

One way that limited resources can be employed by computer systems to perform more, larger and more complex tasks, is to reuse some resources when possible. For example, a large amount of sort space in memory facilitates sorting a large number of results from a query of a large database, but the space in memory is free after the sort is completed and can be used to perform a second sort. The sort space in memory is an example of a reusable resource. Cache space in memory for temporarily holding data from several blocks of a storage medium is another example of a reusable resource. Another example of a reusable resource is communications bandwidth. A large amount of bandwidth is consumed to send a video clip or audio track, but the same bandwidth is available to send another message, clip or track after the first clip or track is transmitted.

Durable storage is typically consumed by a computer system for relatively permanent uses, such as storing data and software. Durable storage is often not a reusable resource for a computer system; typically, as more data ate stored, more durable storage is consumed. However, an example in which durable storage is reusable is the durable storage of undo information. Some entities of the computer system include transactions that make changes to the computer system, such as changing the data stored in a database or changing the state of equipment controlled by the computer system. These transactions might involve hundreds or millions of operations and take minutes or hours to complete. If a transaction does not complete successfully, then the data in the database or the equipment is in some interim state that is not planned and that is probably not desired. It is therefore conventional for the transaction to generate and store in an undo storage space an undo log of data indicating operations to perform to reverse the operations performed during the transaction. Then, if the transaction fails to complete successfully, the changes to the computer system are undone, following the operations in the undo log from last to first. The undo operations restore the computer system to a state before the transaction began, a state that was planned, at least at one point in time, and that is preferable to the unplanned interim state. The durable storage employed to store the undo log is a reusable resource. After the transaction completes, or after the unsuccessful transaction is undone, the undo data in the storage is considered obsolete and the storage allocated to the undo data is re-allocated to another transaction.

Computer systems typically manage reusable resources by reserving some or all of the resource for a particular entity of the computer system and freeing the resource for other entities when the particular entity terminates execution. However, some use may be made of the reusable resource in a given state even after the entity that generated it terminates, and the conventional computer systems do not guarantee the resource will be retained in a given state long enough to support the other uses.

For example, the information in the undo log for a transaction involving a database is used to provide consistent reads of data in a database. A consistent read is an entity of a database system that allows a user of the database to query a database even while transactions are ongoing to change the data in the database. The consistent read is designed to provide data from the database that reflects the last planned state of the database at the time the query is issued. The consistent read handles data involved in an ongoing transaction by using the undo log in the undo durable storage to determine the state of the data before the transaction began operating on the data. Problems may arise if the undo log in the durable undo storage is not retained long enough.

For example, a complex reading query involving thousands of rows of one or more tables may require some minutes to complete. This is not a transaction because the reading query does not change the data in the database. The reading query is allowed to progress even though an update transaction involving some of the same rows is already ongoing, or commences shortly after the reading query is started. While the query causes data to be read from other rows of the tables, a particular row is changed by the transaction and the reverse operation is stored in the reusable undo durable storage. When the query gets to the particular row, the consistent read entity determines that the row has been changed since the start of the query and that the undo log is to be used to reconstruct the state of the row before the transaction started. However, before the consistent read entity retrieves the undo log from durable storage, the transaction completes and commits the changes to the database. The durable storage allocated to the transaction is now available for another transaction. A second transaction begins and reuses the storage space formerly allocated to the first transaction. When the consistent read entity attempts to retrieve the undo log of the first transaction, it finds instead information from the undo log of the second transaction. The consistent read cannot obtain the correct undo information, and the state of the data before the first transaction cannot be reconstructed. The consistent read fails because the undo information was not retained long enough after the transaction was completed to support the use of the undo information by the consistent read entity.

Similar situations may arise if other reusable resources are re-allocated as soon as the entity that generated them terminates and if other entities attempt to retrieve the resource in the state left by the generating entity. While the immediate re-allocation of the reusable resource is sometimes undesirable, it is also undesirable to retain the resource permanently or indefinitely in the state left by the generating entity. Retaining the resource indefinitely in a given state inhibits the reuse of the resource.

Clearly, there is a need for techniques to manage reusable resources, which recycle the resources for new uses by other entities, but that also guarantee the resources are retained in a given state for consistent use by other entities, even after termination of the entity that first had the resource allocated.

SUMMARY OF THE INVENTION

According to one aspect of the invention, techniques for managing, within a computer system, a resource that is reusable by a plurality of entities include establishing a minimum period of time for retaining an amount of the resource after completion of use of the resource by an entity. A first amount of the resource is allocated to a first entity. After allocating the first amount to the first entity, the first amount is prevented from being allocated to a second entity before the minimum period of time expires after the first entity completes use of the first resource.

According to another aspect of the invention, techniques for managing changes in a computer system include, when a first entity makes changes in a computer system, durably storing, in a first storage space, first information about how to remove the changes. After the first entity has terminated, the first information is retained in the first storage space for a time based on a specified minimum amount of time.

According to another aspect of the invention, techniques for managing changes in a computer system include, when a first entity makes changes in a computer system, durably storing, in a first storage space, first information about how to remove the changes. Second information is durably stored in a second storage space. The second information includes data indicating the first storage space and the first entity. When the first entity terminates, data is stored in the second storage space, the data indicating an actual time when the first entity terminates. After the first entity has terminated, the first information is retained in the first storage space for a specified minimum amount of actual time. The retaining step includes, when a second entity makes changes in the computer system at a first time, retrieving from the second storage space the data indicating the actual time when the first entity terminates. It is then determined whether the first time is after the actual time when the first entity terminates by at least the specified minimum amount of actual time. If so, then third information is durably stored in the second storage space. The third information includes data indicating the first storage space and the second entity. Then, fourth information about how to remove changes made by the second entity is durably stored in the first storage space.

These techniques allow resources to be recycled and allocated for new uses by other entities in a computer system, but also guarantee the resources are retained in a given state for consistent use by other entities, even after termination of the entity that first had the resource allocated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1C is a block diagram showing a detail of an undo block from FIG. 1B;

FIG. 1D is a block diagram showing data structures for managing the partitioning of the reusable undo storage space according to an embodiment;

FIG. 2A is a flow chart showing a functional overview of the method for managing a reusable undo storage space in a database system according to an embodiment;

FIG. 3A is a flow chart showing a method for re-partitioning undo storage space while starting a new transaction according to an embodiment;

FIG. 4D is a flow chart showing a method for retaining data in the reusable undo storage space after a transaction has completed use of the data according to an embodiment;

DETAILED DESCRIPTION OF THE PREFERRED EMBODIMENT

A method and computer readable medium for managing a reusable resource is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

Figure 1A:
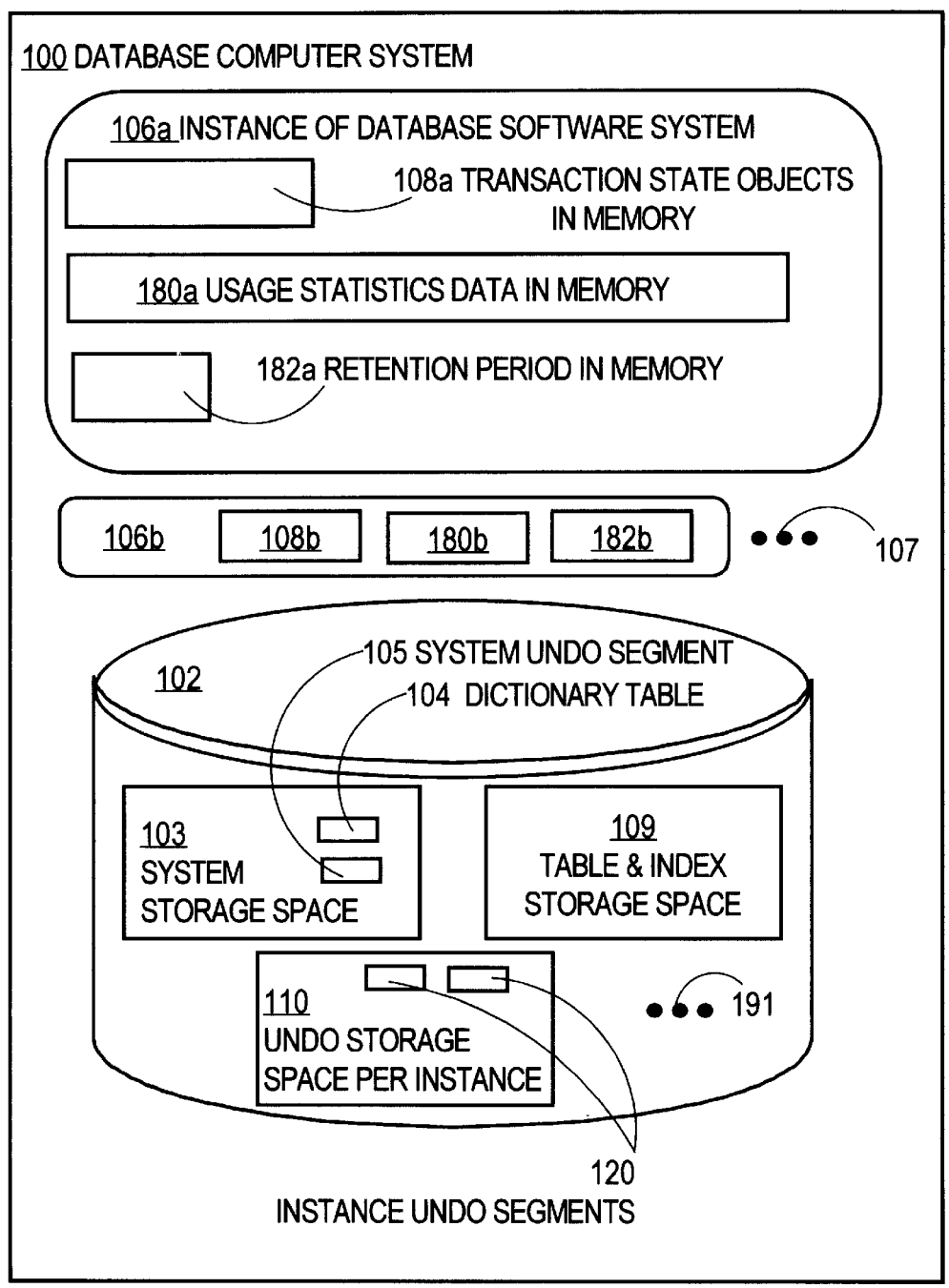
FIG. 1A is a block diagram of a database system reusing undo storage space among a plurality of transactions.

Example embodiments of the invention are described in the context of a computer system executing an instance of a software system for a database, as shown in FIG. 1A. FIG. 1A is a block diagram of a database computer system 100 reusing undo storage space 110 among a plurality of transactions associated with each instance 106 of a database software system. In other embodiments of the invention, the computer system is not confined to managing one or more databases. In other embodiments the reusable resources are not confined to storage space for undo information and may include, for example, one or more portions of main memory, one or more portions of durable storage, one or more bands of communications bandwidth, or any other reusable resource. In other embodiments, the reusable resource is not confined to use by transactions, but may be used by any entities of the computer system.

As shown in FIG. 1A, the database computer system 100 includes durable storage 102, such as disks, as well as one or more processors, not shown, executing the one or more instances 106a, 106b of the database software system, a separate instance for each database. Each instance of the database software system uses durable storage 102 to hold system files in system storage space 103, and to hold the database data in table and index storage space 109. Transactions that change the data in the table and index storage space 109 also generate data in an undo log indicating the operations to perform to reverse the effects of the transaction. The undo log is stored in undo storage space 110. The ellipses 191 indicate that other areas of durable storage 102 may be reserved for table and index storage space and undo storage space for other instances of the database software system. A dictionary table 104 in the system storage space 103 is used by the database system to keep track of the areas of durable storage 102 devoted to table and index space and devoted to undo storage space for the one or more instances executing on the computer system.

Conventional Structural Elements

According to some conventional systems, each entity executing on the computer system that uses a reusable resource is assigned to a segment of the reusable resource. For example, each transaction executing in the instance 106a of the database software system is assigned to one of the segments 120 of the undo storage space 110 for that instance. To support system level transactions, a system undo segment 105 is sometimes included in the system storage space 103. In the illustrated embodiment, a data structure 108 in memory holds transaction state objects that describe the active transactions. Each transaction state object includes a transaction identification (XID), a reference to the assigned segment 120 in the undo storage space 110, and a status of the transaction.

In conventional systems the reusable resource is manually partitioned into one or more segments. For example, in a conventional database computer system, a database administrator who configures an instance of the database software system is prompted to partition the undo storage space 110 into one or more segments during configuration. Also during configuration, the database administrator is prompted to specify a size of each undo segment. More than one transaction can be assigned to the same segment. However, if a transaction is assigned to a segment that is not large enough to hold the entire undo log, an error occurs when the segment runs out of space. Also, if all the segments are assigned one or more active transactions, and the system cannot find a segment with a predefined minimum space for a new transaction, an error occurs if another transaction starts before one of the active transactions terminates.

The segments of the reusable resource are further partitioned in some conventional systems. For example, the segments of undo storage space are further partitioned into blocks and extents of contiguous space on the storage medium. The extents each encompass one or more contiguous blocks of storage. A block of storage is the smallest amount of contiguous storage for which data is transferred between the durable storage 102 and main memory of the computer system. For a particular extent of several blocks, data are more efficiently transferred between main memory and the extent of the durable storage than the same number of blocks distributed non-contiguously over the durable storage. Blocks or extents of storage are assigned to each segment of undo storage space when the software system is configured in the conventional systems.

The conventional systems also include data structures associated with the reusable resource for managing the partitions. For example, a transaction table and extent map are stored in the first blocks of the first extent allocated to each segment. The transaction table provides persistent storage for the information from the transaction state objects in memory, so that the information survives a power failure. The extent map identifies the extents of storage space allocated to the segment.

Structural Elements for Dynamic Partitioning

According to a disclosed embodiment of the invention, the reusable resource is dynamically partitioned based on use of the reusable resource by the entities executing in the computer system. For example, the undo storage space 110 for an instance is dynamically partitioned into one or more segments 120 based on use of the undo storage space by one or more transactions. Methods for performing such partitioning are described in greater detail later. According to the embodiment depicted in FIG. 1A, usage statistics are collected and stored in data structure 180 in memory. Based in part upon the usage data stored in data structure 180a, the number and size of segments 120 in undo storage space 110 are adjusted while the transactions are executing.

Embodiments that dynamically partition the reusable resource include additional elements to track usage of the resource. The number of segments and the allocation of the reusable resource to the segments are described at each moment using the additional elements.

Figure 1B:
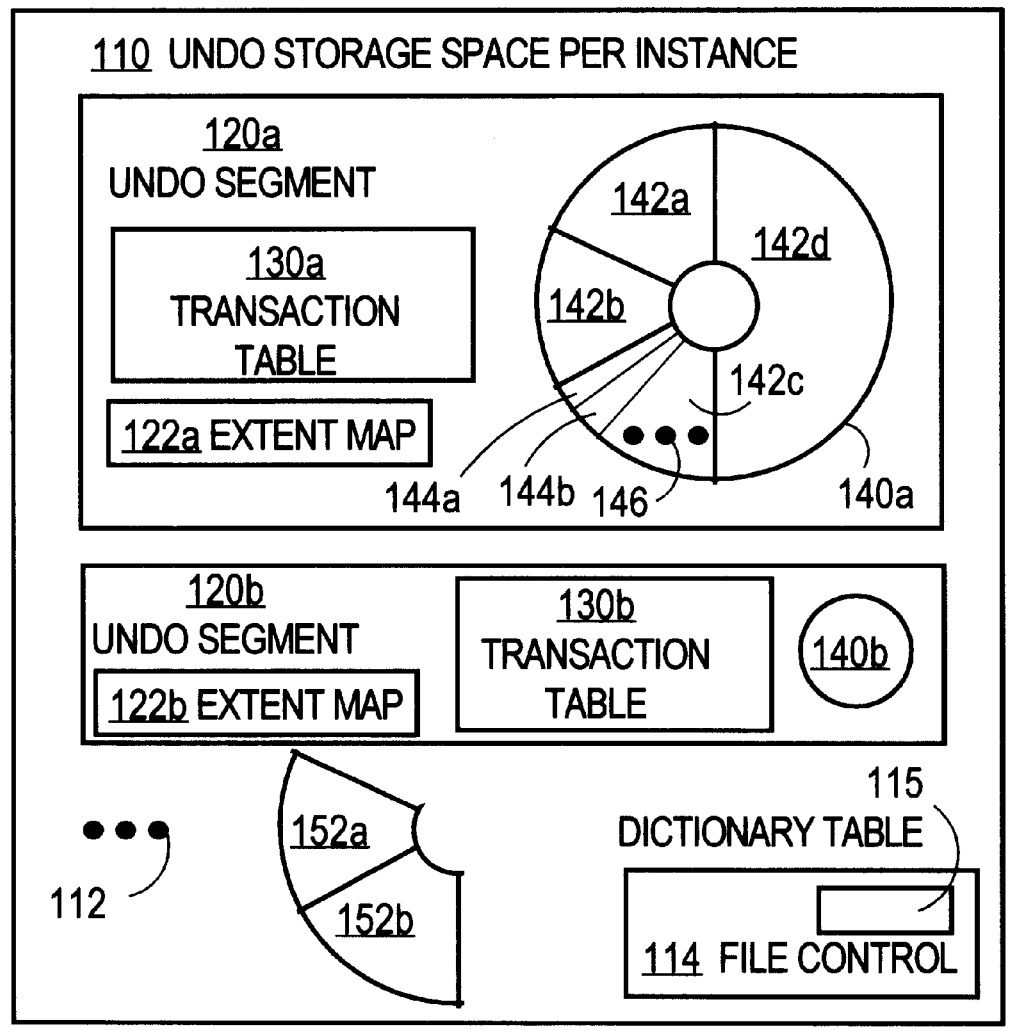
FIG. 1B is a block diagram showing partitioning of the reusable undo storage space of FIG. 1A according to an embodiment.

For example, FIG. 1B is a block diagram showing partitioning of the reusable undo storage space 110 according to an embodiment for dynamically partitioning the undo storage space. FIG. 1B shows undo storage space 110 including segments 120a, 120b. The ellipses 112 indicate further segments included in the undo storage space 110. Each segment 120 includes an extent map 122 and a transaction table 130 in the first blocks of the first extent, and a set of undo blocks 140 for storing the data for the undo log. According to this embodiment, the transaction table and extent map include additional elements to track allocation and usage of the undo storage space, as described in more detail below. Furthermore, the transaction table and extent map include elements for retaining data in the segment after the transaction finishes, as described in more detail below.

As in the conventional database system, the set of undo blocks 140 include one or more extents 142 each made up of one or more undo blocks 144 of storage. For example, the set of undo blocks 140a used by undo segment 120a for storing undo logs of transactions assigned to the segment include the rest of the blocks in the first extent 142a, and all the blocks in the next three extents 142b, 142c, 142d. FIG. 1B shows that extent 142c includes undo blocks 144a, 144b and other undo blocks indicated by the ellipses 146.

Each undo block holds one or more records of the undo log, as illustrated in FIG. 1C. The block size is determined by the storage medium, but the record size is determined by the amount of undo data generated for each operation of the transaction. For example, undo block 145 includes undo records 164a, 164b, 164c and more undo records indicated by ellipses 165. In some embodiments, an undo record too big to fit into one block is broken up into multiple records each small enough to fit into one block. In most database circumstances, a block is large enough to hold multiple undo records.

As in the conventional database system, the undo blocks and extents for storing the undo log are used cyclically, as indicated by the circular shape of the set of undo blocks 140 in FIG. 1B. The first undo record for a transaction using the segment is stored in the first undo block of one of the extents. For example, the first transaction to use segment 120a, has its first undo record stored in the first undo block of the first extent 142a. (As noted above, some blocks of the first extent are used for the transaction table and extent map). Subsequent records fill up the first undo block and use the following undo blocks in the first extent 142a in sequence. When all the undo blocks in one extent are filled the first undo block in the next available extent is used next. For example, if the system does not use the segment for the undo records of another transaction, then after using all the undo blocks in extent 142a, the system stores the next undo record in the first block of the next extent 142b.

When a transaction terminates, a data indicating the termination is written to the transaction table. For example, data indicating the computer system clock cycle at the time of termination and the type of termination is added to the record for the transaction in the transaction table. The type of termination includes, for example, "commit" if the changes are committed to the database, or "abort" if the interim changes were reversed.

The next transaction assigned to the segment has its undo records placed starting after the last undo record of the terminated transaction, sometimes in the same block, but often in the very next block. For example a later transaction that begins after the first transaction has terminated uses the next block 144b in the extent 142c.

The cyclic use of the undo blocks is illustrated if the later transaction continues to generate undo records that fill the remaining blocks in extent 142c and all the blocks in extent 142d. Then the next block used by the system to store the next undo record is the first block of the next unused extent, extent 142a. When this block is used, undo data for the first transaction is replaced by undo data for the second transaction. The undo data for the first transaction is lost. An advantage of the cyclic filling of undo blocks in the conventional system is that the destruction of the undo information from the first transaction is delayed until the subsequent transactions use most of the remaining space in the segment.

A segment may also be used by more than one active transaction at the same time in the conventional system. The undo records of the second active transaction are stored beginning in the next unused block or extent. For example, if a second transaction is assigned to segment 120a, while the first transaction is still using extents 142a and 142b and block 144a of extent 142c, the undo records for the second transaction are placed in the next unused block in extent 142c, undo block 144b. If the undo records from the first or second transaction fill the extent it is using, the next record is written to the next block of the next unused extent. For example, if the undo blocks from the first and second transactions fill extent 142b and 142c, the next undo record is placed in the first block in the next unused extent, 142d. Alternatively, if a third transaction is assigned to the segment 120a, its records are stored starting in the first block of extent 142d. If a third transaction is assigned to segment 120a after the first and second transactions have already started using the last block of the extents 142, then the segment must be extended with another extent. If the extension fails, an error occurs.

According to the illustrated embodiment for dynamically partitioned undo storage space, as shown in FIG. 1B, the undo storage space also includes a file control data structure 114 and free extents 152 not allocated to any segment.

The file control data structure occupies the first blocks of the first extent in the undo storage space. The location of the file control data structure is available to the database software system, for example in the system dictionary table 104 (shown in FIG. 1). The file control data structure includes a bitmap data structure 115 for locating all the extents belonging to the files that constitute the undo storage space. In this embodiment, the bitmap data structure 115 also indicates the associated segment for the extents allocated to segments.

The free extents 152 are allocated to the segments 120 to support transactions assigned to those segments. At times when all the extents are allocated to the segments 120 and the file control data structure 114, no free extents 152 remain in the undo storage space. According to methods for dynamically partitioning the undo storage space, free extents are sometimes allocated to a segment, for use by one or more active transactions assigned to that segment. Also, allocated extents are sometimes de-allocated from one or more segments, to become free extents, when those segments do not use all their extents for active transactions for some period of time.

For example, a first, exceptionally long and complex active transaction has its undo records added to blocks in extent 142a, then in extent 142b, then in extent 142c and then in extent 142d. When all the blocks of extent 142d are filled, there is no available, unused extent left in the segment to accept the next undo record. The lack of unused extents is indicated, for example, in usage data kept in the transaction table and extent map. Under the conventional system, in which too many extents are likely allocated, no free extents may remain; and an error occurs. According to the embodiments for dynamic partitioning, however, free extents are more likely available; and the system allocates one of the free extents 152 to the undo segment 120. In one embodiment, data indicating the allocation are added to the bitmap data structure 115 of the undo storage space 110. For example, extent 152b is allocated to segment 120a and this is indicated in the bitmap data structure 115. Also, extent map 122a is updated to indicate another extent is allocated to the segment. The undo blocks of the newly allocated extent are logically included in the set of undo blocks 140a between undo extents 142d and 142a. The next undo record is then placed into the first block of the newly allocated extent 152b and the transaction table and extent map are updated to indicate the usage by the active transaction.

De-allocating extents rarely used by a segment, causes free extents to be accumulated. Examples of de-allocation are described in more detail in a later section.

Structural Elements for Time-Based Retention

FIG. 1D is a block diagram showing data structures for managing the partitioning of the reusable undo storage space according to an embodiment that allows undo data to be retained after the transaction that generated the undo data terminates.

Retaining undo logs is useful because, for example, the information in the undo log is used to provide consistent reads of data in a database. A consistent read is an entity of a database system that allows a user of the database to query a database even while transactions are ongoing to change the data in the database. The consistent read is designed to provide data from the database that reflects the last planned state of the database at the time the query is issued. The consistent read handles data involved in an ongoing transaction by using the undo log in the undo storage space to determine the state of the data before the transaction began operating on the data. Problems may arise if the undo log in the undo storage is not retained long enough.

As shown in FIG. 1A, the illustrated embodiment of the present invention includes a retention period of time 182 residing in memory of the instance of the database software system. The value of the retention period of time affects how long, after a transaction has terminated, the undo log will be retained in a segment of undo storage. An initial value for the retention period is defined when the software system instance is configured. The value of the retention period may be changed by a database administrator during execution of the transaction. In some embodiments, described in more detail in a later section, the value for the retention period is changed based on usage of the undo storage space stored in the data structure 180.

In the illustrated embodiment, the retention period is expressed in units of actual time, such as seconds of wall clock time, not in computer system clock numbers. A computer system typically includes a clock that sends out pulses at a regular interval indicated by the reciprocal of the clock frequency. Computer clock frequencies range from a few million cycles per second (a megaHertz) to hundreds of megaHertz, and continue to increase. Relative timing for operations in the computer system are determined by counting these pulses. A higher count indicates a later time. However, the user who wishes to retain data does not perceive the number of pulses issued by the computer system clock, but instead perceives the passage of actual time, as expressed in seconds, minutes, hours, on a wall clock, for example, and in days and years. The number of computer clock pulses that correspond to units of actual time depends on the frequency of the clock circuit. Thus, in the illustrated embodiment, the retention period is designated in units of actual time, not a number of computer clock cycles.

As shown in FIG. 1D, a transaction table includes a transaction row 131. The table may include additional rows as indicated by the ellipses 139. There is one row in the transaction table for each transaction actively using the undo blocks. Some rows may correspond to transactions that have recently terminated. Each row includes a field 132 for a transaction ID (XID) and a field 133 containing data indicating a status of the transaction, as in a conventional system. The indicated status is at least one of "active" or "inactive." In another embodiment, the status includes two kinds of active status, "progressing" and "aborting," and two kinds of inactive status, "aborted" and "committed."

The row 131 also includes field 134 to indicate the extent and block where is located the undo records of the undo log belonging to the transaction, as in the conventional system. In one embodiment, the location indicated is an end block in a linked list of blocks. For example, the location indicates the last block used to store undo records. Referring to FIG. 1C, each undo block 145 includes a field 162 with data pointing to the previous block used to store undo records for this transaction. The pointer to the previous block is used by the system in case the system jumped to the current block from another extent or past the undo blocks used by another active transaction. Referring again to FIG. 1D, an advantage of keeping the location of the last block used in field 134 is that the system can directly find the block for storing the next undo record. If, instead, the first block is recorded in the transaction table row and the pointer field (162 in FIG. 1C) in the block points to the next block, then the entire chain must be followed every time the system attempts to add an undo record. Another advantage of keeping the location of the last block in field 134 is that undo records are used in reverse order during a consistent read and during an abort.

According to the embodiment that supports time-base retention, the transaction table row 131 also includes field 136 to record the time when the transaction terminates. As described in more detail in a later section, the system uses the termination time stored in field 136 and the retention period to determine whether the undo blocks used by the terminated transaction may be reused by another transaction. According to this embodiment, undo blocks may not be reused until after the blocks expire. The blocks expire after a time equal to the retention period stored in memory 182 has passed past the time indicated by the transaction termination time stored in field 136. As described in more detail later, an exception is made if no other undo storage space 110 is available for an active transaction. When no other space is available for an active transaction, an undo block may be used by the active transaction any time after the termination time of the earlier transaction, even if the retention period has not passed after the termination time, i.e., even if the undo block has not expired.

In the illustrated embodiment, the time recorded in the termination time field 136 is actual time. A human user identifies a particular instant of time with a date-time designation in actual time, such as a year since a historical event, a month of the year, a day of the month and a time of day. A computer clock number restarts from zero each time the computer is powered up. A block will not be retained for the proper period if the computer loses power before the block expires. Therefore, the time stored in the termination time field 136 is actual time.

The extent map lists all the extents allocated to the segment. As shown in FIG. 1D, an extent map includes a map record 123 for each extent allocated to the segment. The map may include additional records for additional extents as indicated by the ellipses 129. Each record includes a field 124 for an extent identification (extent ID) and a field 125 containing data indicating an extent use flag. The extent ID is used in the transaction table to indicate an extent location used by a particular transaction. The extent ID is also used in the bitmap data structure 115 to define characteristics of the extent. The use flag indicates at least one of "active" or "inactive." An active extent is one currently used by an active transaction. An active extent may be used by more than one active transaction. An inactive extent may be used by a new transaction.

According to the embodiment that supports time-base retention, the extension map record 123 also includes field 126 to record the time when the most recently active transaction terminates, here also called the "inaction start time." As described in more detail in a later section, in some embodiments the system uses the inaction start time stored in field 126 and the retention period to determine whether the extent may be reused by another transaction. According to this embodiment, the extent may not be reused until after the extent expires. The extent expires after a time equal to the retention period stored in memory 182 has passed past the time indicated by the inaction start time stored in field 126. As described in more detail later, an exception is made if no other undo storage space 110 is available for an active transaction. When no other space is available for an active transaction, an extent may be used by the active transaction any time after the inaction start time, even if the retention period has not passed, i.e., even if the extent has not expired. In some embodiments, the inaction start time for an active extent is indicated by a value of "NULL."

Because one extent may hold many transactions, the inaction start time is overwritten each time a transaction terminates. Thus the inaction start time will always contain the time of the last transaction to terminate in an extent. Therefore, if the extent is not overwritten before the extent expires, no block in the extent will be overwritten before that block expires. For example, if a particular block was written for one transaction, which terminates at 9:17:01 on Jan. 13, 2001, the inaction start time for the extent is 9:17:01 for that date. If other blocks in the same extent are later written by a different transaction, which terminates at 9:18:12 on the same date, then the inaction start time for the extent is 9:18:12 for that date. If the retention period is one hour, the particular block expires at 10:17:01 on that date and the extent expires on 10:18:12 of that date. Thus, when the extent expires at 10:18:12 the particular block has also expired.

In this embodiment, the data is retained on an extent-by-extent level. In other embodiments, the data is retained on other levels of partitioning, such as a segment-by-segment level or a transaction-by-transaction level or a block-by-block level. A disadvantage of an embodiment that retains data on a transaction-by-transaction level of partitioning is that many more checks have to be made for each decision on where to start the next transaction. This is because an extent often includes hundreds of blocks and holds data for hundreds of small transactions. The extra checks can consume excessive amounts of time and adversely impact a user waiting for transactions to be performed. Similar problems apply to retaining data on a block-by-block level. A disadvantage of an embodiment that retains data on a segment-by-segment level, is that much storage space that is really available will appear unavailable. An entire segment is rendered unavailable even though only one transaction involving just a few blocks in one extent is being retained.

The level of partitioning at which to apply a retention period can be readily discovered for any embodiment based on observations of performance. In general, the unit of a reusable resource retained is preferably at the same level of partitioning used to dynamically re-allocate the resource among segments. In the example database system, the extent is the unit of storage space for retaining undo data and for dynamically allocating undo space to undo segments.

The status of the transaction in field 133 indicates usage of the blocks in the linked list of blocks. Therefore the data indicating usage includes the status of the transaction in field 133 and the record location in field 134. In embodiments providing for a specified retention period after a transaction terminates, the time the transaction terminates in field 136 also indicates usage of the blocks in the linked list of blocks for the transaction. Therefore the data indicating usage includes the termination time in field 136 of the rows of the transaction table. Similarly, the extent ID in field 124 and the use flag in field 124 and the inaction start time in field 126 indicate usage of extents of blocks. Therefore the data indicating usage includes the extent map. According to the disclosed embodiment of the invention, the re-partitioning of the undo storage space is based on the data indicating usage.

Functional Overview

FIG. 2A is a flow chart showing a functional overview of a method 200 for managing a reusable undo storage space according to an embodiment of the database system.

In step 202, the database system is configured. More detail on this step is given with reference to FIG. 2B. During configuration, a database administrator specifies a maximum amount of durable storage for each of one or more instances of the database software system. Unlike conventional systems, the administrator is not obligated to estimate and specify the number of segments and the sizes of those segments.

During configuration, the database administrator also specifies a default retention period to use absent other information when the instance begins executing. Unlike conventional systems with sufficient space, this database system guarantees retaining undo data for at least the specified retention time if the undo storage space is sufficient.

In step 204, an instance of the database software system begins executing. In step 206, the instance is assigned one of the undo storage spaces configured during step 202. The assignment of the undo storage space may be performed in any conventional way for selecting one of several selectable items. In some embodiments, the system chooses the next available undo storage space based on some predefined order. In other embodiments, the database administrator starting the instance is presented a list of available undo storage spaces with characteristics, such as maximum size; and, the database administrator selects one. In still other embodiments, other methods are used to select one of the undo storage spaces.

In step 208, the assigned undo storage space is initially partitioned by allocating one or more extents to each of several segments. An example embodiment of step 208 is described in more detail with reference to FIG. 2C.

In step 210, the partitioned undo storage space is used by the system to store the undo logs of one or more transactions. In step 212 the system monitors usage of the undo storage space by the transactions. Embodiments of step 212 are described in more detail below with respect to FIG. 5A and FIG. 5B.

In step 214, the undo storage space is re-partitioned by re-allocating extents, forming and deleting segments, and changing the retention period based on usage by the transactions. After re-partitioning, control passes back to step 210 to use the new partitions of the undo storage space.

Embodiments of step 214 in response to new transactions are described in more detail with reference to FIG. 3. Embodiments of step 214 in response to active transactions adding undo data are described in more detail with reference to FIG. 4A and FIG. 4B. Embodiments of step 214 directed to retaining data in segments beyond termination of a transaction are described in more detail with reference to FIG. 4C and FIG. 4D. Embodiments of step 214 directed to de-allocating extents and deleting segments are described in more detail with reference to FIG. 6. Embodiments of step 214 directed to changing the retention period are described with reference to FIG. 7.

Preliminary Steps

Figure 2B:
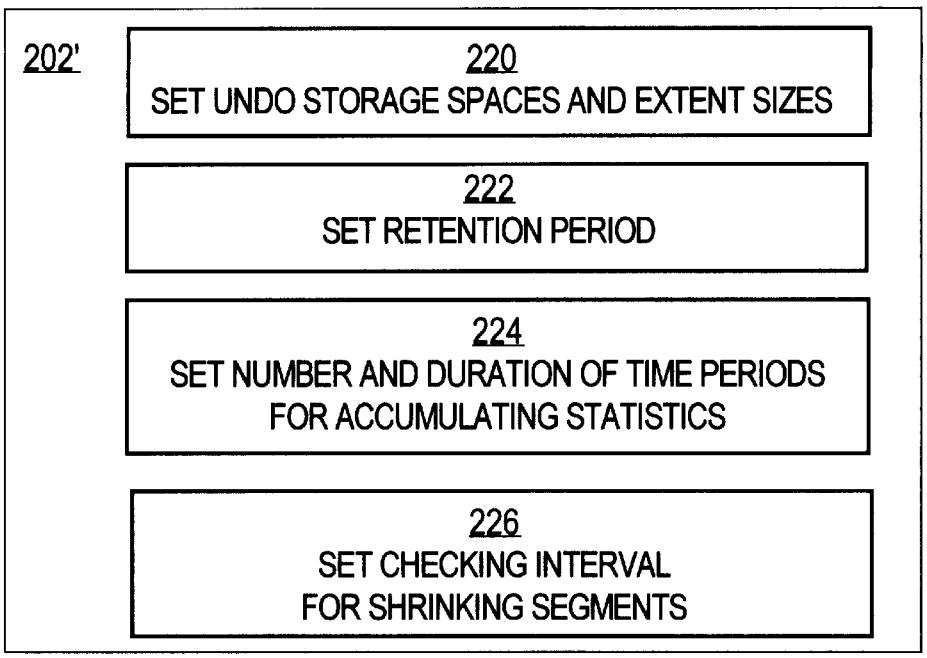
FIG. 2B is a flow chart showing a method for configuring the database system to manage the reusable undo storage space according to an embodiment of a step in FIG. 2A.

FIG. 2B is a flow chart showing a method 202' for configuring the database system to manage the reusable undo storage space according to an embodiment of step 202 in FIG. 2A.

In step 220 one or more undo storage spaces are set. In one embodiment, the maximum amount of storage space is indicated as a set of files of a given number of extents. In some embodiments, extents of different sizes are defined In step 222, the database administrator sets the default retention period. One period may be used for all instances, but in most embodiments, a different period is set for each instance, depending on the database being managed. For example, a value for the retention period is set based on the administrator's expectation that undo logs should be saved to support consistent reads for a particular database. For consistent reads, the retention period should be greater than the time to perform such reads. If the administrator expects the longest running reading queries, such as a query to support a month-end report, to execute for almost one hour, then the administrator should set the retention period to more than an hour, such as 1.5 hours. The longer the retention period, the more undo storage space a given set of transactions consume.

In some embodiments, the retention period is not checked or changed while instances are running. In some embodiments, however, the administrator may check the retention period based on usage. As described in more detail below, the usage data indicates how much of the undo storage space is being consumed and how long the longest query has executed. If the longest running query is much shorter than the retention period, or if almost all the undo storage space is being consumed, the retention period should be reduced. In some embodiments, the retention period is checked when the instance of the database system runs out of undo storage space. In some embodiments, an analysis period for checking the retention time is also determined in step 222. The analysis period is the length of time over which usage data is reviewed. A favorable value can be determined readily through experimentation. In an example embodiment, the analysis time is 12 hours.

In some embodiments, in step 224 the database administrator sets the number and duration of time periods for accumulating statistics indicating usage of the undo storage space by the system during each instance. In other embodiments step 224 is omitted and the intervals for computing statistics are predetermined by the system. For example, 144 periods of ten minutes each provide statistics that respond to variations in usage greater than ten minutes and shows that history for a duration of 24 hours. The number and duration of time periods are used to define and fill an array for monitoring usage of undo storage space over time.

In some embodiments, in step 226, the database administrator sets a time interval for checking whether segments should be shrunk, that is, the amount of storage space allocated to the segments should be reduced. In other embodiments step 226 is omitted and the intervals for checking whether segments should be shrunk are predetermined by the system. As used here, shrinking segments includes deleting segments.

If the shrinking interval for checking whether segments should be shrunk is too short, then too many system resources are consumed checking use of each extent of each segment, and system performance may be noticeably degraded. If the shrinking interval is too long, the system may run out of free extents for allocating to segments that have been assigned many or complex transactions. When the system runs out of free extents, the system must check each extent of each segment until enough unused or expired extents are found to accommodate the transaction, for every transaction that fills the last unused or expired extent in its segment. This also may noticeably degrade system performance. A proper value for the shrinking interval for a particular database system is obtained readily through experimentation. For the example embodiment, a shrinking interval of 12 hours is used.

In some embodiments, a shrinking analysis period different than the shrinking interval is also defined in step 226. Again, such a period may be determined readily through experimentation. In the illustrated embodiment the shrinking analysis period is 12 hours, the same as the shrinking interval.

Figure 2C:
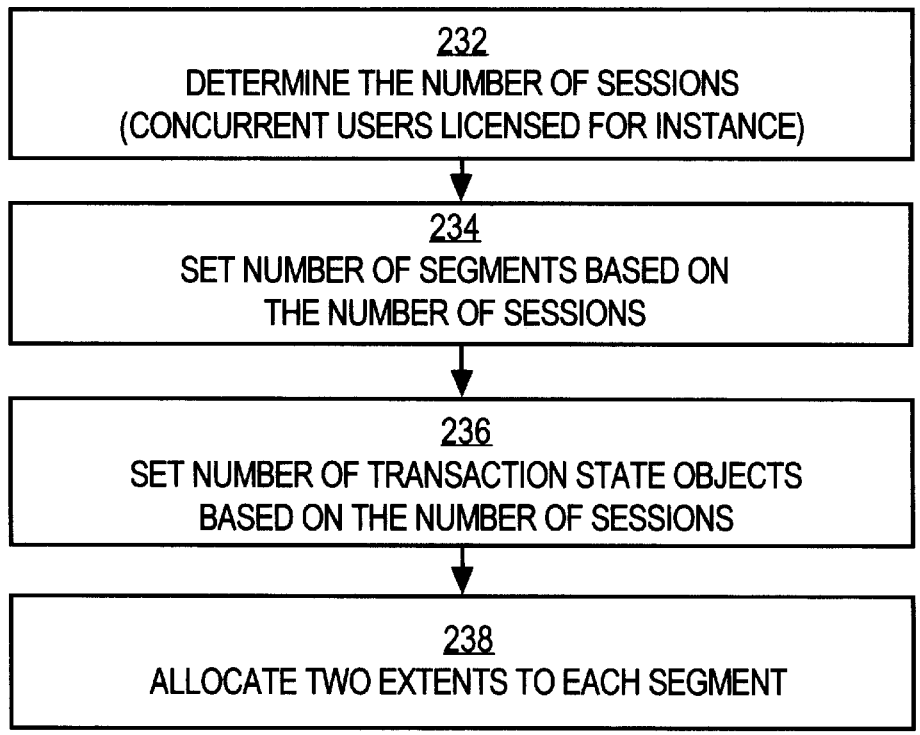
FIG. 2C is a flow chart showing a method for initially partitioning the reusable undo storage space according to an embodiment of a step in FIG. 2A.

FIG. 2C is a flow chart showing a method 208' for initially partitioning the reusable undo storage space according to an example embodiment of step 208 in FIG. 2A.

In step 232 the number of sessions is determined. In one embodiment involving a licensed database system, the number of sessions is the number of users who may use a database at one time according to the license for the database system. In another embodiment, the number of sessions is a system parameter determined during configuration to limit the number of concurrent users for performance reasons. In either embodiment, the number of sessions is determined because the number of transactions executed concurrently by an instance, and consequently the amount of undo storage space used, is expected to depend on the maximum number of concurrent users. The more users, the more transactions are expected; and the more transactions executed, the more storage space is expected to be used.

In step 234 the initial number of segments is set based on the number of sessions. The relationship between number of sessions and initial number of segments may be determined readily through experimentation.

In step 236 the number of transaction state objects (TSOs) is also set based on the number of sessions for the instance. The TSOs are stored in the data structure 108 in memory depicted in FIG. 1A. Unlike segments, the TSOs are not used after a transaction terminates. The relationship between number of sessions and initial number of TSOs may be determined readily through experimentation.

In step 238 the undo storage space is partitioned into the number of segments determined in step 234, and each segment is allocated a minimum number of extents for a segment. In the illustrated embodiment, the minimum number of extents for a segment is two extents. The transaction table and extent map data structures are formed in the first blocks of the first extent allocated to each segment. In one embodiment, the first two extents allocated to a segment have extent sizes that are the smallest of the set of extent sizes predetermined in step 220. This keeps the size of segments small until usage dictates the segments grow in size, as described in more detail in a later section. In other embodiments, a different number of extents or extent sizes are initially allocated to each segment.

The extents not allocated to the initial number of segments or to the file control data structure (114 in FIG. 1B) are initially free extents.

Starting Transactions and Segments

FIG. 3A is a flow chart showing a method 300 for using previously partitioned undo storage space or re-partitioning undo storage space while starting a new transaction, according to an embodiment of method 200. The embodiment illustrated in FIG. 3A provides for retaining undo data in a segment for at least a retention period after the transaction terminates. In another embodiment, which does not provide for retaining data in the segment for at least a retention period, an inactive extent is considered an expired extent. Such an embodiment is equivalent to the illustrated embodiment when the retention period is set to zero.

Herein, a block or extent is considered unused if the block or segment is inactive or expired. As described above, an undo block is inactive if the transaction that wrote undo records in the undo block terminates; and an undo block has expired if the transaction terminated at least the retention period before the current time. An extent is inactive if all its undo blocks are inactive; and an extent has expired if all its undo blocks have expired. In this context, an undo block never used since a segment has formed is considered both inactive and expired at the time the segment is formed.

In step 302 a new transaction with XID of "X1" is started to change data in table T1 of a database managed by the current instance. The XID is added to the TSO in the data structure in memory. Adding the XID to a TSO can be considered a request for undo storage space by the new transaction X1. In response, the new transaction is assigned a segment where the undo log that the transaction generates is stored. The remaining steps of method 300 are directed to choosing a segment to assign to the transaction X1 and storing the association between segment and transaction in the TSO and the transaction table.

In step 306 it is determined whether a segment can be found that has only expired transactions, i.e., has no unexpired transactions. Such segments have every block of every extent available for storing undo records and are likely to have the most room for new undo logs. If such segments are found, control passes to step 324 to select the starting extent and starting block for the new transaction. If no such segments are found, control passes to step 310.

Figure 3B:
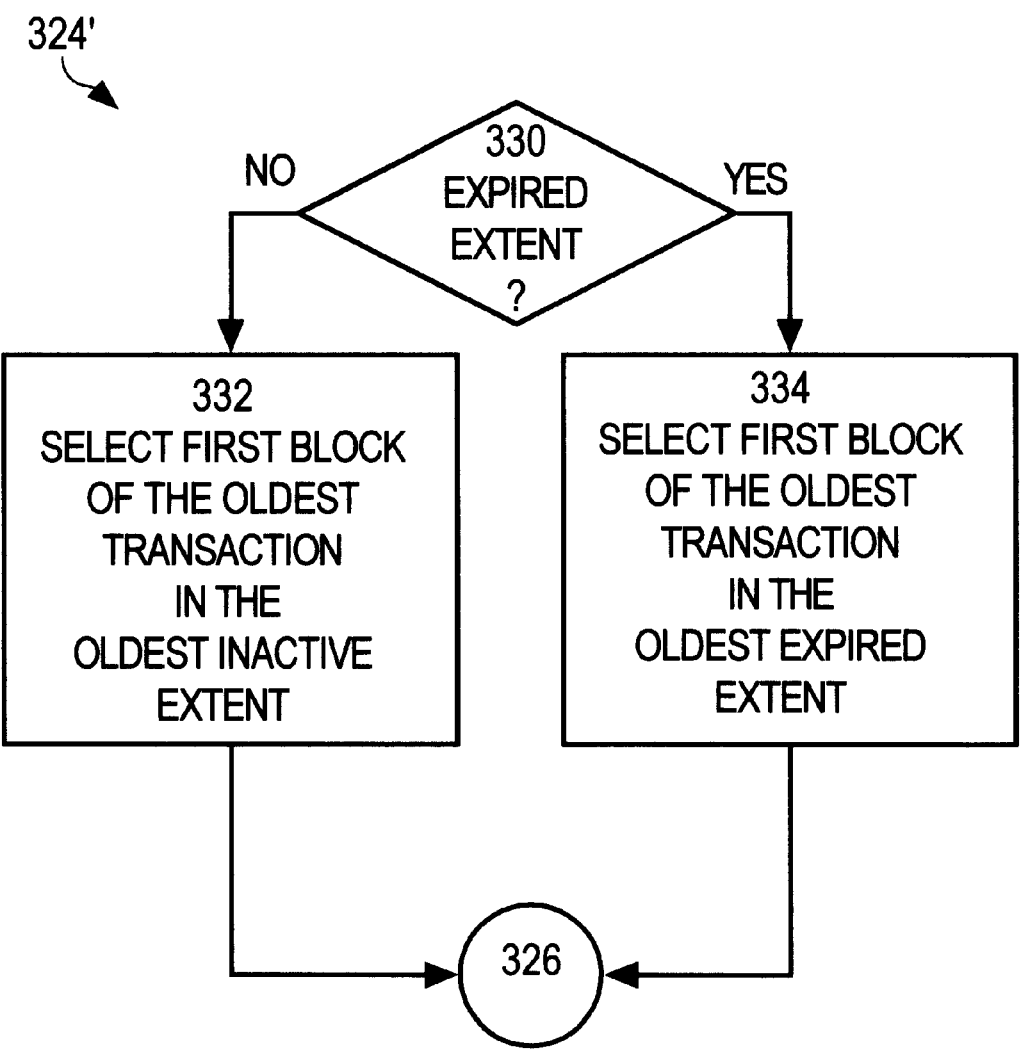
FIG. 3B is a flow chart showing a method for selecting the first extent and block of a new transaction assigned to a segment according to an embodiment of a step in FIG. 3A.

In step 324, the starting extent and starting block is selected in segment 120a for the transaction X1. FIG. 3B is a flow chart showing a method 324' for selecting the first extent and block of a new transaction assigned to a segment according to an embodiment of step 324 in FIG. 3A. In step 330, it is determined whether the assigned segment has an expired extent. If so, control passes to step 334 to select the oldest expired extent of the segment as the starting extent for the new transaction. Also in step 334, the starting block in the starting extent for the new transaction is selected to be the first block that belongs to the oldest transaction in the starting extent. In some circumstances, as described below, a new transaction may be assigned to a segment that has no expired extents, but has at least one inactive extent. In such circumstances, step 330 passes control to step 332 to select the oldest inactive extent of the segment as the starting extent for the new transaction. In step 332 the starting block in the starting extent for the new transaction is selected to be the first block that belongs to the oldest transaction in the starting extent.

In step 310, it is determined whether a new segment can be formed from the free extents of unallocated undo storage space. In the illustrated embodiment, at least two free extents are used to form a new segment. If a new segment can be formed, then the first few blocks of the first allocated extent are used to form the transaction table and extent map of the new segment and control passes to step 322 to select the first extent and the first block for the first undo record of the new transaction. In step 322, the first extent is selected as the starting extent for the new transaction, and the first undo block in the first is the starting block for the new transaction. As noted above, the undo blocks in an extent do not include the first few blocks of the first extent devoted to the transaction table and extent map. According to step 310, unallocated extents of undo storage space are allocated to form a new segment based on a request to use undo space by a new transaction.

If a new segment cannot be formed from unallocated space in step 310, then control passes to step 312. For example, if there are fewer than two free extents remaining in the undo storage space, then a new segment is not formed in this embodiment and control passes to step 312. By the time control passes to step 312, only segments that already include at least one unexpired transaction are left. To take on a new transaction, at least one of these must also have at least one inactive extent. Thus when no segment is found with an expired extent, undo data will be written to an extent that is inactive but has not yet expired.

If no segment can be found with at least one inactive extent, then control passes to step 314 to throw an error indicating that undo storage space is entirely consumed at the moment. The new transaction cannot begin.

In step 312, if more than one segment is found with at least one inactive extent, then the segment is selected that is the least used. The least-used segment is defined in different ways in different embodiments. In general, the least-used segment is a segment that, by some measure, is expected to have a greater likelihood of absorbing another transaction than the other segments.

For example, according to one embodiment, the least-used segment has the fewest rows in the transaction table that indicate an active status. According to another example embodiment, the least-used segment has the fewest rows in the transaction table that indicate the transactions' blocks have not expired. The blocks belonging to a transaction have not expired if the termination time is earlier than the current time by less than the retention period. According to yet another example embodiment, the least-used segment is the segment allocated the most inactive extents. The use flag in the extent map indicates whether the extent is active. According to yet another example embodiment, the least-used segment is the segment allocated the most extents that are expired. An extent has expired if the inaction start time is earlier than the current time by at least the retention period. In yet other example embodiments, the least-used segment has the largest sum, over all the records in the extent map, of the number of blocks in each expired extent or inactive segment. This measure accounts for some extents being larger than other extents. In other example embodiments, a combination of one or more of the measures mentioned above is used to define the least-active segment. For example, in one embodiment the least-used segment contains the most expired extents, and among those with the most expired extents, the least-used segment also has the most inactive extents. This embodiment first finds any segments with expired extents so that data can be retained for the retention period; and only when no expired extents are found, does this embodiment rely on a segment with only inactive extents.

However defined, several segments may qualify as the least-used in a given embodiment. If several qualify, then any one of the qualified segments may be assigned to the new transaction, X1.

If a least-used segment is found with at least one inactive extent, control passes to step 324 to select the starting extent and starting undo block for the first undo record of the new transaction X1.

Control passes to step 326 after the starting extent and starting undo block are elected, in either step 324 or step 322. In step 326, the segment is associated with the transaction by binding the extent ID for the first extent allocated to the segment to the transaction identification XID in the TSO. Control then passes to step 328.

In step 328, the association between the extent ID and XID is persistently stored in the transaction table by adding a row to the transaction table of the segment with the XID of the new transaction, X1, and with the starting extent and starting undo block where the first undo record is stored. The first undo record is written to the starting undo block. For example, data indicating an operation to reverse the change to table T1 is written to the first undo block of the first extent allocated to the first segment in the undo storage space.

By the steps shown in FIGS. 3A and 3B, an existing segment of a reusable resource is associated with a new entity under some conditions; and, under other conditions, a new segment is formed and associated with the new entity.

Growing Segments Based on Use

Figure 4A:
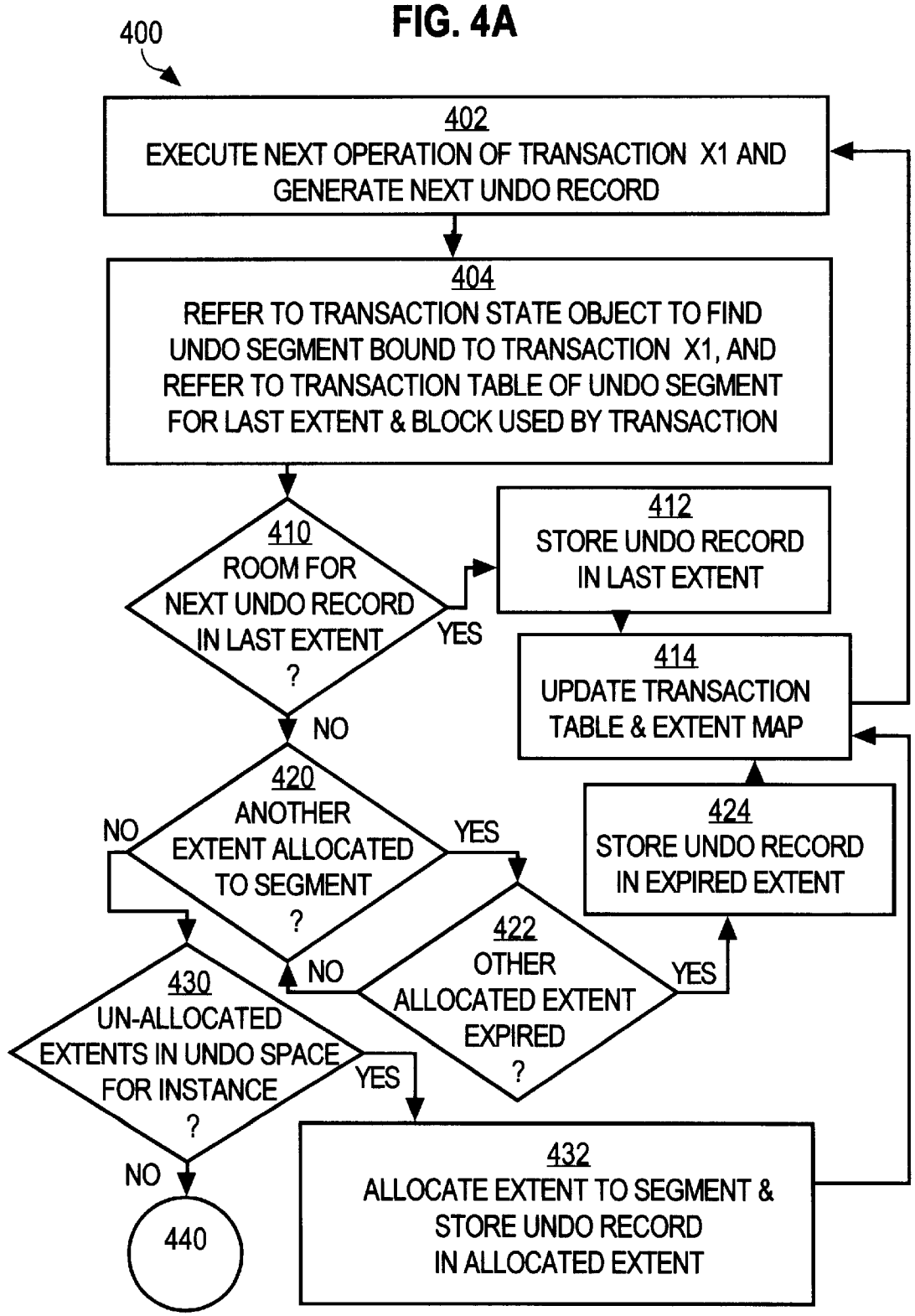
FIG. 4A is the first part of a flow chart showing a method for re-partitioning undo storage space while adding undo data for an active transaction.
Figure 4B:
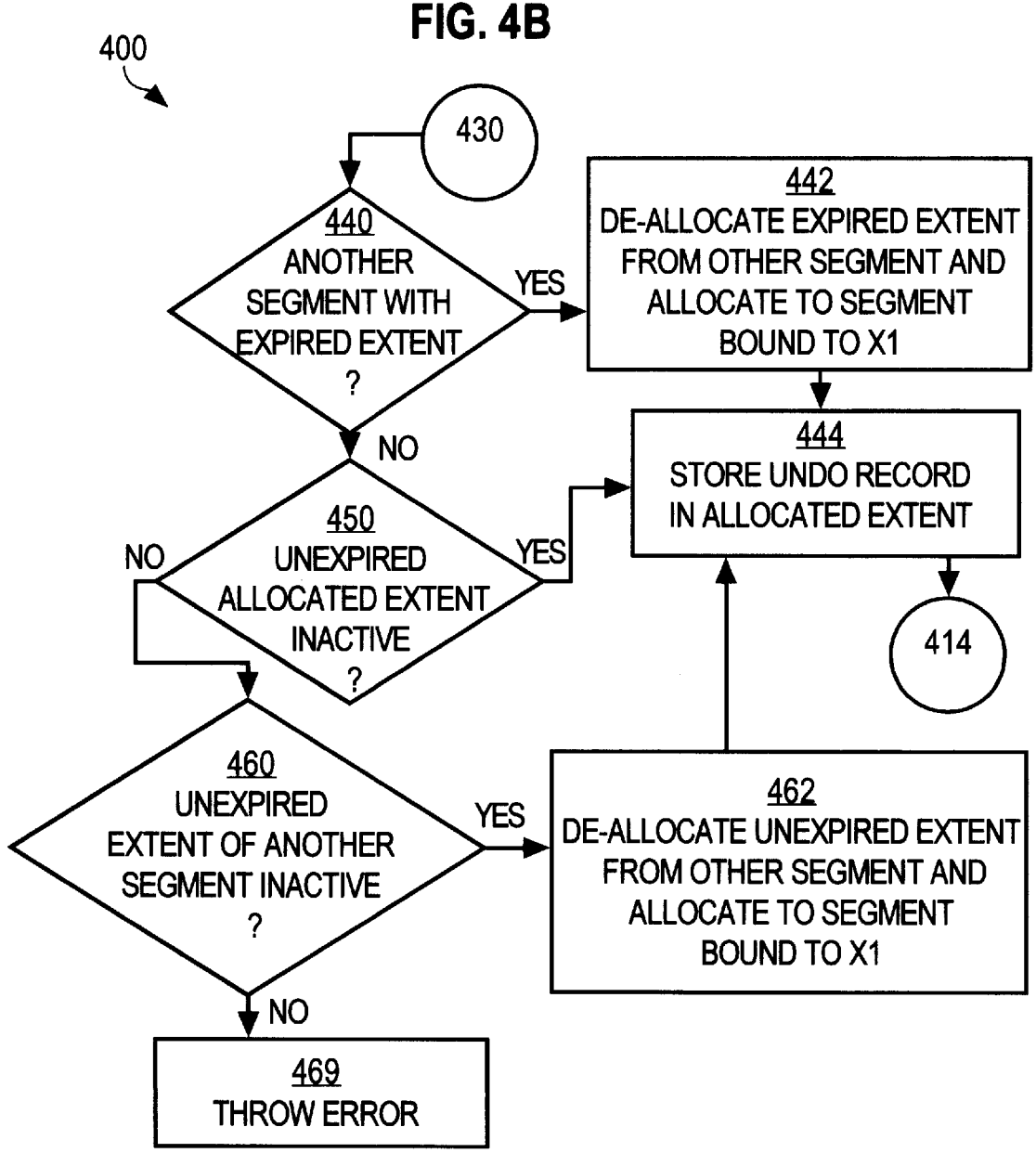
FIG. 4B is the last part of the flow chart started in FIG. 4A.

FIG. 4A and FIG. 4B together form a flow chart showing a method 400 for re-partitioning undo storage space among segments while adding undo data for an active transaction.

The embodiment illustrated in FIGS. 4A and 4B provides for retaining undo data in a segment for at least a retention period after the transaction terminates. In another embodiment, which does not provide for retaining data in the segment for at least a retention period, an inactive extent is considered an expired extent. Such an embodiment is equivalent to the illustrated embodiment when the retention period is set to zero.

In step 402 the next operation of a transaction is executed to further change data in a database managed by the current instance, and a corresponding next undo record is generated. The next undo record can be considered a request for further undo storage space by the transaction. For example, transaction X1 executes a second operation on Table T1 and generates another undo record. In response, the next undo record is added to a block in the segment assigned to the transaction and the transaction table is updated. Under some circumstances described below, free extents are allocated to the segment. Under other circumstances, also described, an unused extent is stolen from another segment. Under both circumstances the extent map is updated to indicate the new allocations.

In step 404, the system refers to the transaction state objects (TSOs) to find the undo segment bound to the transaction and retrieves the information about the transaction from the transaction table for that segment. For example, the system obtains the TSO for transaction X1 and finds data indicating segment 120a. The system then accesses the transaction table for the associated segment, and retrieves the row for the transaction. For example, the system accesses the transaction table for segment 120a and retrieves the row for transaction X1. The row includes fields indicating the extent and block where the last undo record was stored. For example, the row indicates that the last undo record was stored in the last block of the first extent allocated to the segment.

In step 410 it is determined whether there is storage space for the next undo record in the last extent. If so, then control passes to step 412 to store the next undo record in the last extent. For example, if the last undo block has the capacity to take another record, then the undo record is simply stored in the last undo block and control passes to step 412. Similarly, if the last undo record filled the second to last block of the first extent, then the last block in the first extent is available to take the next undo record.

In step 412, the undo record is stored in the undo block of the last extent. When the first undo record in placed in the next undo block, data pointing to the prior block is also stored in the undo block. Control then passes to step 414 to update the transaction table and extent map. More detail on step 414 is given in a later section with reference to FIG. 4C. After step 414, control passes back to step 402 to execute the next operation of the transaction.

If it is determined in step 410 that the next undo record does not fit in the last extent, then control passes to step 420 to find another extent allocated to the segment. In step 420, the extent map for the segment is used to find the next extent. If no other extent is allocated to the segment, then control passes to step 430. Otherwise control passes to step 422 to determine whether the next extent is expired. This is determined using the information in the extent map as described in more detail in a later section with respect to FIG. 4D.

If another allocated extent has expired, control passes to step 424 to store the next undo record in the expired extent. In one embodiment, the undo record is stored in the first undo block belonging to the earliest terminated transaction in the extent. Then control passes to step 414 to update the transaction table and extent map and cycles back to step 402 to execute the next operation of the transaction.

If it is determined in step 422 that the next allocated extent has not expired, control passes back to step 420 to find another allocated extent. Control passes back and forth between steps 420 and 422 until an expired extent is found and control passes to step 424, or until no more allocated extents remain in the extent map of the segment, and control passes to step 430.

In step 430, it is determined whether any free extents are available in the undo storage space for the current instance of the database system. If there is a free extent, control passes to step 432. In step 432, the free extent is allocated to the segment by updating the bitmap data structure and adding a map record to the extent map. In embodiments with a set of predetermined extent sizes, the free extent allocated to the segment has a size selected from the predetermined set based on the current size of the segment. The larger extents are added to the larger segments. Using this approach, fast growing segments associated with long, complex transactions are provided with space more efficiently by a few large extents than by numerous small extents.

Also in step 432, the next undo record is stored in the first block of the newly allocated extent. Control then passes to step 414 to update the transaction table and extent map to reflect the newly stored undo record.

If it is determined in step 430 that the undo storage space has no free extents, then control passes to step 440 in FIG. 4B. In step 440 and following steps, an attempt is made to steal an unused extent from another segment based on data indicating usage.

In step 440, it is determined whether another segment is found with an expired extent in the undo storage space. If so, the expired extent is stolen from the other segment in step 442. In step 442, the expired extent is de-allocated from the other segment and references to it are removed from the extent map. The extent just de-allocated is then allocated to the current segment. The bitmap data structure is updated to show the extent is allocated to the current segment. For example, an expired extent is de-allocated from segment 120b and allocated to segment 120a bound to transaction X1 that is generating the undo records. Control then passes to step 444 to store the undo record in the newly allocated extent, and subsequently to step 414 to update the transaction table and extent map to reflect the newly stored undo record.

If it is determined in step 440 that no other segment has an expired extent, then, according to this embodiment, attempts to ensure undo data are retained for the retention period after a transaction terminates are abandoned in order to find some space to store the new undo data. This decision is based on a recognition that the need to recover from interim changes to the database is greater than the need to reconstruct a former state of the database after a set of changes are committed. The consistent read is considered less important than error recovery during writes. Thus, if no extent in the undo storage space has expired, then the undo records are stored in any inactive extents, in which all transactions have terminated, even though the extents have not yet expired. First, unexpired but inactive extents are sought in the current segment, then such extents are sought in other segments.

Therefore, if it is determined in step 440 that no other segment has an expired extent, then control passes to step 450. In step 450, it is determined whether the current segment has, among the extents allocated to the current segment, an inactive extent. If so, control passes to step 444 to store the undo record in the allocated extent. Subsequently, control passes to step 414 to update the transaction table and extent map to reflect the newly stored undo record.

If it is determined in step 450 that no other allocated extent is inactive, then control passes to step 460. In step 460, it is determined whether another segment is found with an inactive extent in the undo storage space. If so, the inactive extent is stolen from the other segment in step 462. In step 462, the inactive extent is de-allocated from the other segment and references to it are removed from the extent map. The extent just de-allocated is then allocated to the current segment. The bitmap data structure is updated to show the extent is allocated to the current segment. For example, an inactive extent is de-allocated from segment 120b and allocated to segment 120a bound to transaction X1 that is generating the undo records. Control then passes to step 444 to store the undo record in the newly allocated extent, and subsequently to step 414 to update the transaction table and extent map to reflect the newly stored undo record.

If it is determined in step 460 that no other segment has an inactive extent, then an error is thrown in step 469, indicating that no further space can be allocated to the segment.

In embodiments in which provisions are not made to ensure data is retained in undo storage space for the retention period after a transaction terminates, an inactive extent is considered to be an expired extent. In such embodiments, steps 450 and 460 are redundant with steps 422 and 440, respectively, and are omitted.

According to method 400, segments grow by having additional extents allocated to the segments when undo records added to active transactions fill extents already allocated. When free extents are unavailable during growth, unused extents are stolen from other segments.

Retaining Data in Segments for Specified Time

In the conventional database systems, undo records are added to the inactive extents in the blocks belonging to the earliest transaction to terminate. This delays overwriting undo data of the more recent transactions in an extent. However, it does not guarantee that the delay is any particular length of time. In some circumstances, undo logs for a transaction might be overwritten within seconds or milliseconds of the time the transaction terminates.

For example, referring to FIG. 1D, a long and complex transaction is the first transaction assigned to segment 120a. The system stores the undo records generated by the transaction in undo blocks starting with undo blocks 145a, 145b in the first extent 142a and continuing in succession through the undo blocks in extent 142b, the undo blocks 144a, 144b in extent 144b. After storing an undo record in the second block 144b of extent 142c, a second transaction assigned to the segment begins to use extent 142d. Then the long and complex transaction continues operation until it terminates and writes the last undo record in the block 144c near the end of extent 142c. The transaction is now considered inactive and so marked in the transaction table. This renders extents 142a, 142b, 142c inactive. Extent 142d is active with the second transaction. As soon as a third transaction is assigned to the segment, undo blocks from the third transaction are stored beginning in the last extent used by the most recently terminated transaction, the first transaction, overwriting blocks associated with the earliest terminated transaction. In this example, the blocks to which no undo data has yet been written are considered to have terminated at a time that is the retention period before the time when the segment was formed, which is earlier than the first transaction terminated. So the third transaction begins storing undo records in block 144d. The third transaction fills the rest of extent 142c in just a few seconds or milliseconds. The next extent used by the third transaction is the next inactive extent in the cycle, extent 142a (extent 142d is active with the second transaction). Thus the third transaction next uses the first block belonging to the earliest terminated transaction in extent 142a. Since no transaction terminates in the extent, the earliest transaction is the only transaction; and the first block is 145a.

As soon as the third transaction writes an undo record to block 145a, the undo records previously stored in block 145a can no longer be used for a consistent read. The undo data has been retained in useable form in the undo segment for only a few seconds or milliseconds after the first transaction terminated.

The inability in the conventional system to ensure that undo data will be retained in the undo segment is especially disadvantageous because it interferes with a consistent read even if the consistent read begins before the first transaction terminates. For example, if the consistent read begins when the first transaction is storing undo records in block 144b of extent 142c, then the consistent read proceeds backwards from block 144b to block 144a to the last block in extent 142b, etc. The third transaction will overwrite block 145a before the consistent read attempts to read block 145a. The consistent read will fail after proceeding for a long time.

Figure 4C:
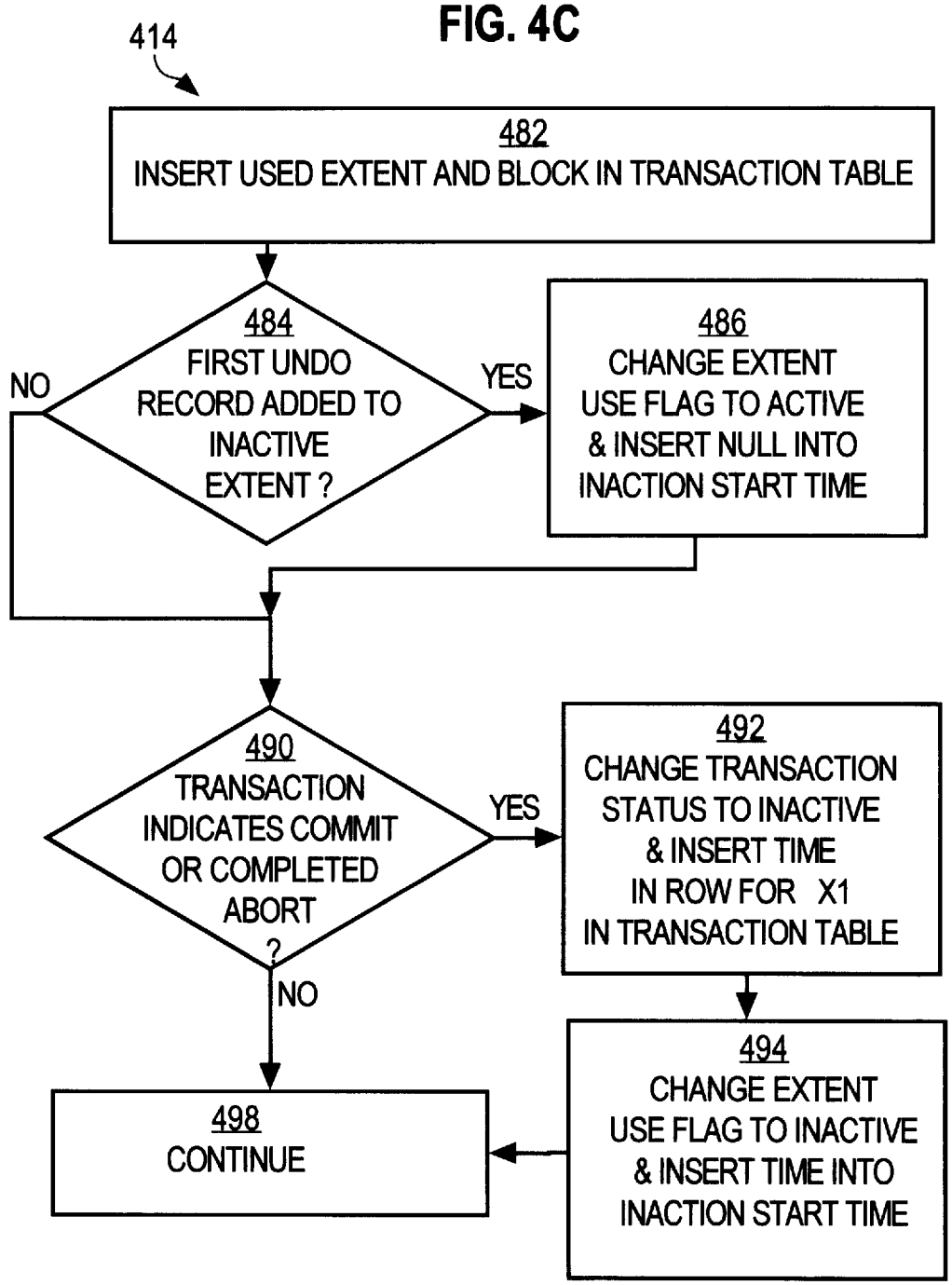
FIG. 4C is a flow chart showing a method for updating data structures used to manage the undo storage space according to an embodiment of a step in FIG. 4A and FIG. 4B.

FIG. 4C is a flow chart showing a method 414 for updating data structures used to manage the reusable resource. These data structures are employed to allow data to be retained in undo storage space for at least a minimum time after the transaction terminates. Herein, the minimum time is called the retention period. The undo storage space devoted to a transaction, such as blocks and extents, expire when the retention period has passed after the transaction terminates. Those blocks and extents remain expired until again used to store undo blocks for another transaction. As shown in FIG. 4A and FIG. 4B, method 414 is invoked when an undo record is stored in a particular block of a particular extent.

In step 482, data indicating the particular extent and the particular block is inserted into the record location field (134 in FIG. 1D) of the transaction table in the transaction row having an XID matching the transaction that generated the undo record. This step is optional if the undo record is added to the same block as the immediately preceding undo record. Control then passes to step 484.

In step 484, it is determined whether the particular extent was inactive before adding the current undo record to the particular block. If so, then the use flag in the extent map should be updated from indicating an inactive extent to indicating an active extent. Control passes to step 486 to change the value of the extent use flag (125 in FIG. 1D) to data indicating "active" use. In addition, the actual date-time value of the inaction start time field (126 in FIG. 1D) is changed to indicate no inaction start time. For example, the value of the inaction start time is set to NULL or zero. The inaction start time is employed to determine when an inactive extent expires. By changing the value of the inaction start time to indicate no actual date-time, the system ensures that the extent cannot expire while the extent is active with storing undo records of a transaction that has not terminated. In an alternative embodiment, the system does not alter the inaction start time; but, instead, relies on the extent use flag 125 to ensure that the extent cannot expire while still in use for storing undo records.

In step 490, it is determined whether the transaction table record just stored indicates that the transaction is terminating. A transaction terminates when the changes are committed to the database, or after interim change have been undone for an aborted transaction. An aborted transaction employs the undo log stored in the undo blocks belonging to the transaction to restore the database to its state before the transaction started. The transaction terminates when the database is restored to its state before the transaction started.

If it is determined that the transaction is not terminating, then control passes to step 498 to continue with the steps following step 414. However, if it is determined that the transaction is terminating, then control passes to steps 492 and 494 before continuing in step 498.

In step 492, the transaction table is updated by updating the row having an XID equal to the current transaction. The actual date-time value of the termination time field (136 in FIG. 1D) is changed to indicate the current actual date-time. For example, the value of the termination time field is set to indicate 9:17:01 on Jan. 13, 2001. If the retention period is one hour, the transaction expires at 10:17:01 on Jan. 13, 2001. The undo blocks belonging to the transaction also expire at that time In step 494, the use flag (125 in FIG. 1D) in the extent map is updated from indicating an active extent to indicating an inactive extent. In addition, the actual date-time value of the inaction start time field (126 in FIG. 1D) is changed to indicate the current actual date-time. For example, the value of the inaction start time is set to indicate 9:17:01 on Jan. 13, 2001. If the retention period is one hour, the extent expires at 10:17:01 on Jan. 13, 2001. Also in step 494, other extents are examined to determine those that are active only for the transaction that is terminating. The extents actively used only by the terminating transaction are all converted to inactive extents with the inaction start time of 9:17:01 on Jan. 13, 2001.

According to the method of step 414, each transaction records its own termination time. If several inactive transactions have stored undo data in blocks in the same extent, the extent map naturally records the termination time of the most recently terminated in the inaction start time field of the extent map record. Thus, if an extent expires, every transaction storing undo data in blocks of the extent has also expired, and, thus, all the blocks of the extent have expired.

FIG. 4D is a flow chart showing a method 470 for retaining data in the reusable undo storage space after a transaction has completed use of the data according to an embodiment. The steps of method 470 are employed whenever the system determines whether an extent of a segment has expired or is inactive. For example, method 470 is employed by step 422 in FIG. 4A and by steps 440, 450 and 460 in FIG. 4B.

In step 471, the inaction start time for the current extent is obtained from the map record in the extent map. For example, the value obtained from the inaction start time field (126 in FIG. 1D) from map record 123 is 9:17:01 on Jan. 13, 2001.

In step 472 it is determined whether the inaction start time indicates no actual time, such as NULL time. If so, the extent is active and not expired. It is being used to store undo records of an active transaction. The retention period cannot be applied to this extent. In the alternative embodiment, step 472 is replaced by a determination whether the use flag indicates an active status. If so, the extent is active and not expired. Control passes to step 473, which passes control along the path for active or unexpired extents, as determined by the method which invokes method 470.

If it is determined in step 472 that the extent is inactive, control passes to step 474 and following steps. The extent is inactive and holds only undo records, if any, of transactions that have terminated.

In step 474, the sum is computed of the inaction start time and the retention period. The retention period is stored in main memory, as shown in FIG. 1A. The sum represents the expiration time for the extent. For example the retention period indicated by data stored in data structure in main memory (182a in FIG. 1A) is one hour. The sum of 9:17:01 on Jan. 13, 2001 and one hour is the expiration time of 10:17:01 on Jan. 13, 2001

In step 475, the current actual time is obtained. For example, a current time of 10:15:01 on Jan. 13, 2001 is obtained.

In step 476, it is determined whether the current time is before the expiration time by determining whether the current time is less than the sum. For example, the current time (10:15:01 on Jan. 13, 2001) is less than the sum (10:17:01 on Jan. 13, 2001), indicating the current time is before the expiration time.

If the current time is before the expiration time, the extent is inactive but still unexpired. Control passes to step 477, which passes control along the path for inactive or unexpired extents, as determined by the method which invokes method 470.

If the current time equals, or is later than, the expiration time, the extent is both inactive and expired. Control passes to step 478, which passes control along the path for inactive or expired extents, as determined by the method which invokes method 470.

The embodiment of FIG. 4 stores and employs the times that transactions terminate in the transaction table and extent map. This is an advantage because it allows the retention period to be modified while the instance is running. The retention period should be changed while an instance is running, if, for example, the retention period was inadvertently initially set to several months instead of several hours. Such a long retention period would quickly consume all reasonable amounts of undo storage space. It is desirable to be able to correct the retention period. Also, as described below, it is advantageous in some embodiments to allow the retention period to vary with usage. By storing the termination time rather than the expiration time, a new expiration time is always immediately known when the new retention period is determined.

If, on the other hand, the expiration time is stored in the data structures and the retention period is subsequently changed, the stored expiration time is wrong. The old retention period should be subtracted from the stored expiration time and the new retention period should be added to compute a correct expiration time. Whether this is done each time the retention period is changed, or each time the extent is checked by adding steps to the method 470, extra computations have to be made that burden the system. Such a correction procedures becomes even more burdensome if the retention period is changed multiple times. Then there may be uncertainty about which old retention period to subtract. This may lead to a need for a history of retention periods and for storing a time when the expiration time was computed. Alternatively, every transaction row and extent map record may have to be visited and possibly updated whenever the retention period is changed.

Usage Indicators and Statistics

As described above, the data indicating usage include the status of the transaction, the record location, and the termination time stored in the transaction table, and includes the extent map. In addition to these data, statistical data are collected to indicate usage of the undo storage space. The statistical data are used in further steps to re-partition the reusable resource.

Figure 5A:
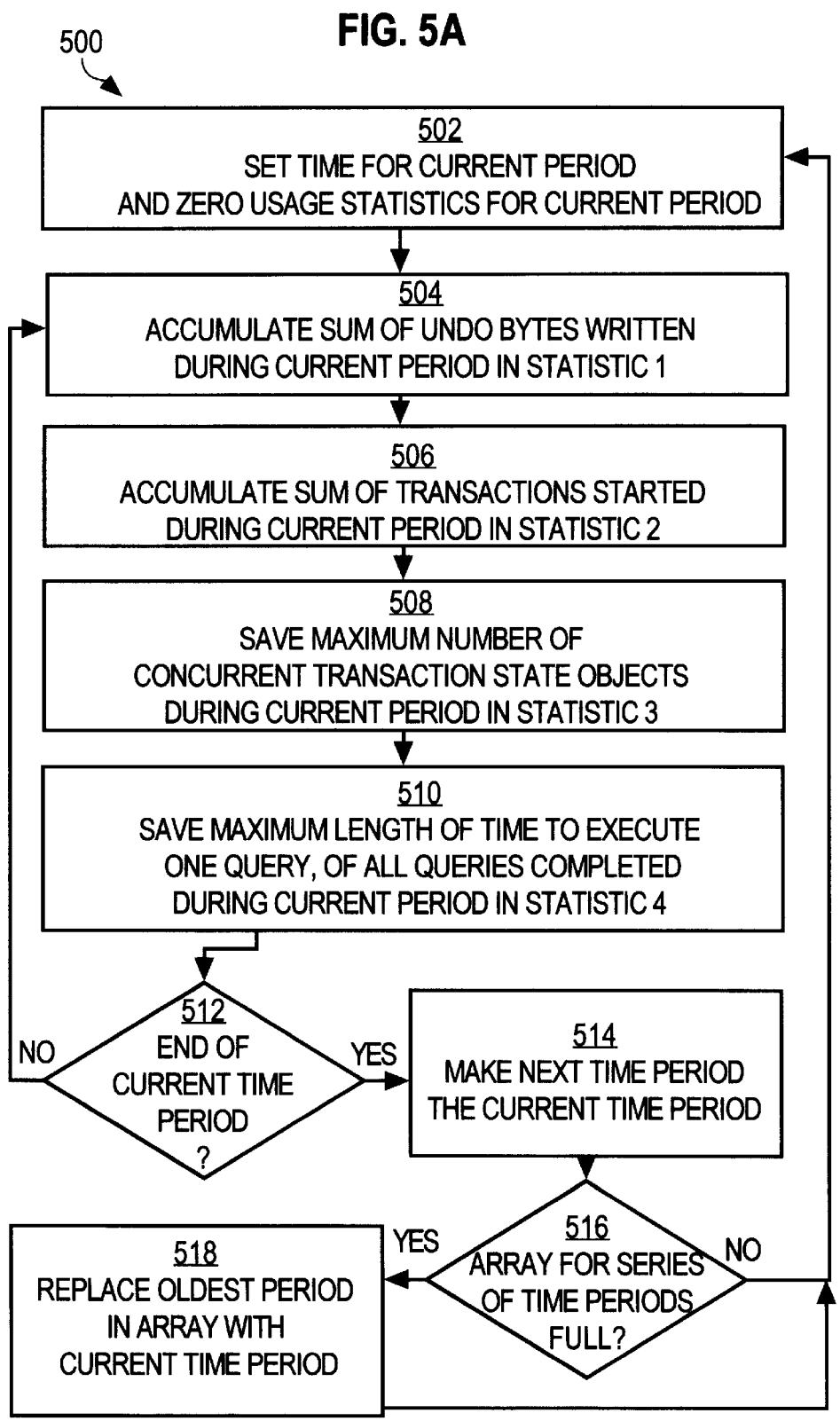
FIG. 5A is a flow chart showing a method for collecting statistics of undo storage usage according to an embodiment.

FIG. 5A is a flow chart showing a method 500 for collecting statistics of undo storage usage according to an embodiment. In step 502, the time is set for the current period of the series of periods for monitoring statistics over time defined during configuration in step 224. Variables for storing statistics within one period are initialized. For example, the variables for the statistics accumulated in the illustrated embodiment are set to zero.

In step 504 the number of bytes of undo records are added to the variable for Statistic-1. For example, whenever an undo record is added to an undo block for any transaction in any segment, the variable for Statistic-1 is updated by adding the number of bytes to the value already held in the variable.

In step 506, the number of transactions started are added to the variable for Statistic-2. For example, whenever a transaction ID is added to a transaction table of any segment, the value held in the variable for Statistic-2 is incremented by one.

In step 508, the maximum number of concurrent TSOs is checked and updated in Statistic-3. For example, whenever, a TSO is formed, a count is made of the number of TSOs indicating active status. That number is compared to the number already held in the variable for Statistic-3. If the number of active TSOs is greater than the value already held in the variable for Statistic-3, the value of the variable for Statistic-3 is replaced by the number of active TSOs.

In step 510, the maximum length of time to execute one query is checked and updated in Statistic-4. For example, whenever a reading query is initiated, a date-time designation in actual time is detected and stored to a temporary variable. Whenever the reading query ends, a date-time designation in actual time is detected and differenced with the value in the temporary variable. The difference is the duration of the reading query in actual time. The duration of the reading query is compared to the value already held in the variable for Statistic-4. If the duration is greater than the value already held in the variable for Statistic-4, the value of the variable for Statistic-4 is replaced by the duration of the query.

In step 512 it is determined whether the current period of the series of periods for accumulating statistics has ended. For example, it is determined in step 512 whether the 10 minutes of one period has ended. If not, control returns to steps 504, 506, 508, 510 to continue to accumulate statistics. However, if the current period ends, the next period is made the current period in step 514. If the array for holding the statistics for the number of periods in the series, determined during configuration in step 224, is not yet full, control passes to step 502 to set the time for the current period and zero out the variables. If the array is full, then control passes to step 518. In step 518, the element of the array associated with the oldest period is used to accumulate the statistics for the current period. Control then passes to step 502 to set the time for the current period and zero out the variables.

In the example embodiment, statistics are kept for 144 time periods of 10 minutes each. An array of 144 elements for each of four statistics and for actual time is filled up over the course of 24 hours. After 24 hours the array elements having the oldest time are replaced by the current time. Thus the time and statistics for the $145^{th}$ ten-minute interval is placed in the 1st element of the array. As a result of the steps depicted in FIG. 5A, a value for each of the four statistics and time is accumulated in an array of time periods.

Figure 5B:
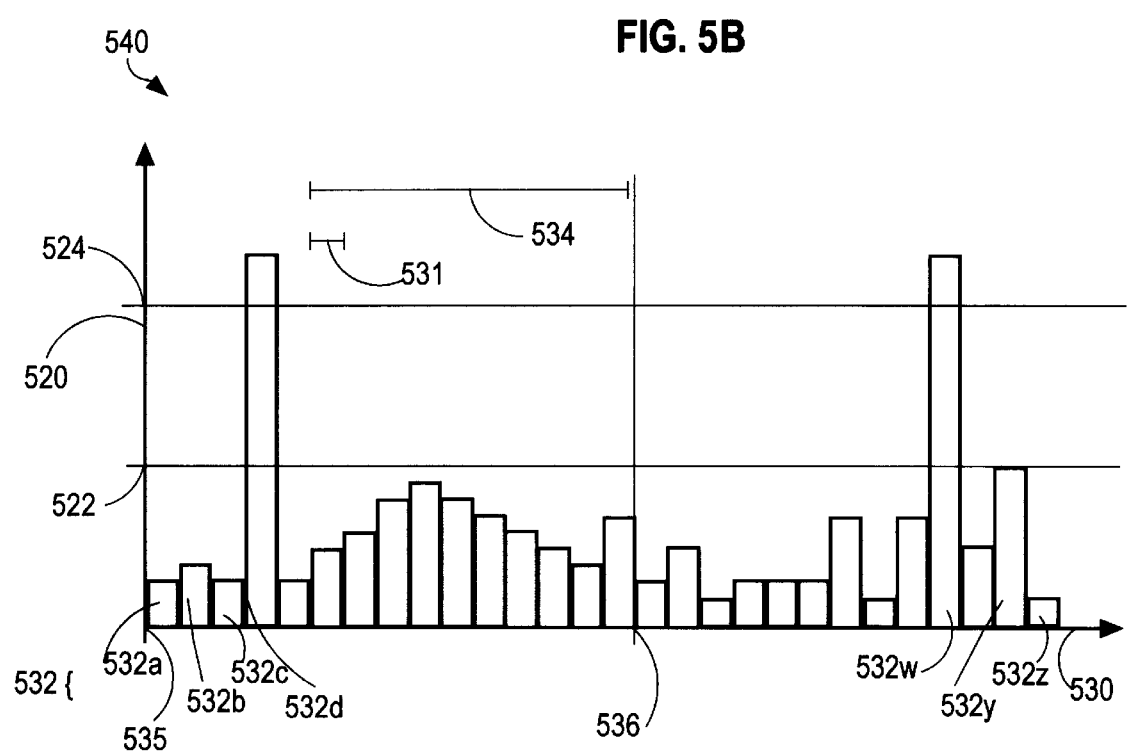
FIG. 5B is a graph showing usage data for one statistic of a hypothetical example illustrating monitoring usage with time according to an embodiment.

FIG. 5B is a graph showing usage data 540 for one statistic of a hypothetical example illustrating monitoring usage with time according to an embodiment. The vertical axis 520 represents relative values of the statistic. The horizontal axis 530 represents time. The time interval 531 represents the period over which statistics are accumulated, e.g., 10 minutes. The value of a statistic for any time interval is represented by the height of the bar 532. The graph 540 is used to determine when to re-partition a reusable resource to increase or decrease the amount of the reusable resource allocated to one or more segments.

For example, the number of segments for the undo storage space of the database computer system should be about the same size as the maximum number of concurrent transactions encountered over a day of operating a database system. In this example, graph 540 depicts the value of Statistic-3 over a series of 28 half-hour periods. The vertical coordinate 522 represents a maximum of 10 concurrent transactions in one half hour period. The vertical coordinate 524 represents a maximum of 20 concurrent transactions in one half hour period. Graph 540 is used to determine if the undo storage space has been partitioned into about the right number of segments based on an analysis performed at the time represented by the horizontal coordinate 536. The analysis period is indicated by the time interval 534.

As a result of the large number of concurrent transactions that occurred in the fourth time period, represented by bar 532d, the undo storage space has been partitioned into more than 20 segments. This is a consequence of the method 300 depicted in FIG. 3A, which adds segments, as free extents allow, to keep only one transaction per segment, if possible. Yet for the five hours preceding the analysis time at time coordinate 536, represented by time interval 534, the maximum number of concurrent transactions is less than ten. Ten segments would suffice for the five hours preceding the analysis time. Based on this statistic one embodiment of the system reduces the number of segments from over 20 to about ten. As can be seen in FIG. 5B, reducing the number of segments to ten also suffices for several hours after the analysis time. Managing the reusable resource with fewer segments improves performance and leaves more free extents for allocating when demands for the reusable resource increase in peak periods.

According to one embodiment, a database administrator will be able to have the system display the histograms of the accumulated statistics, such as graph 540.

Figure 6:
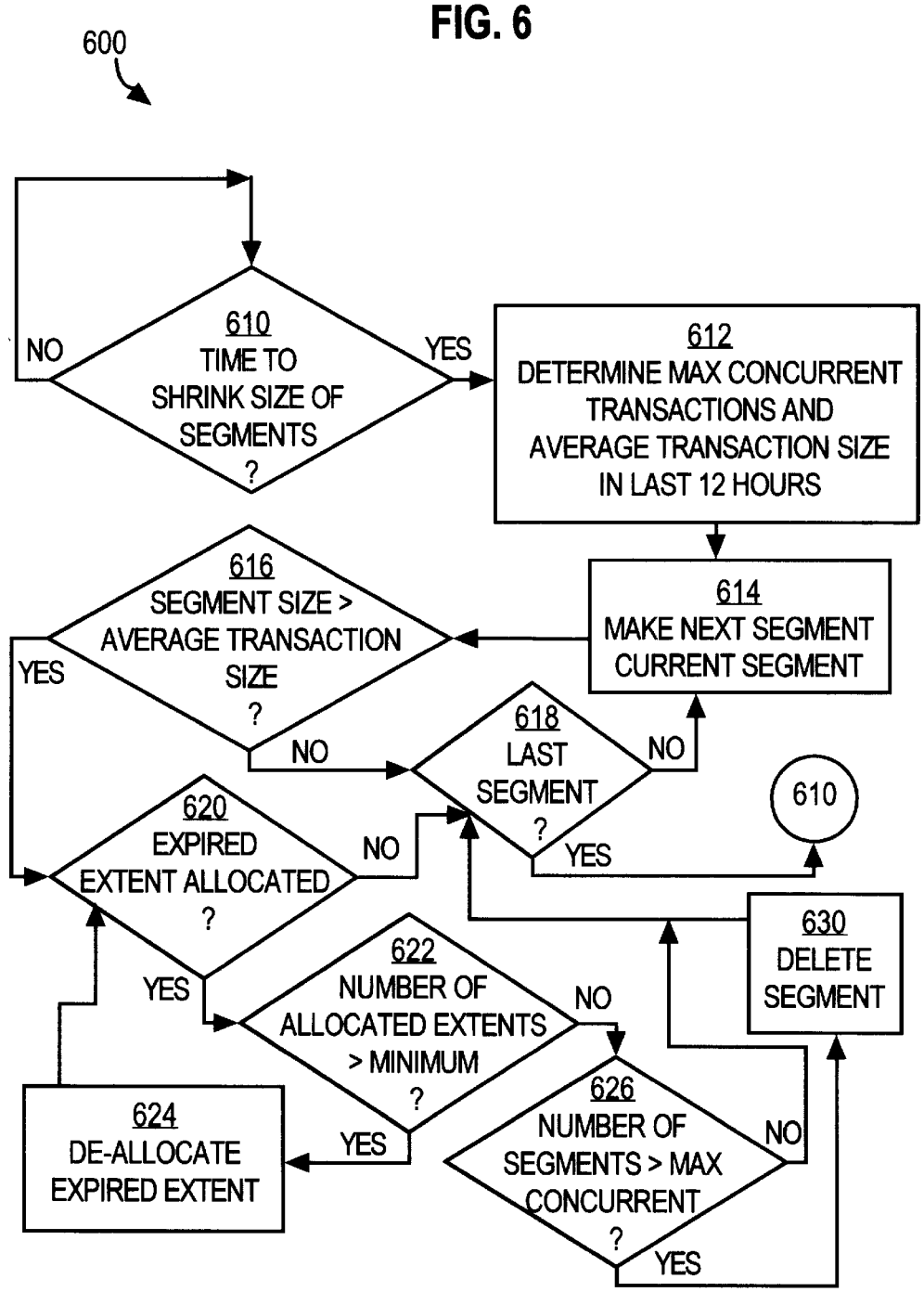
FIG. 6 is a flow chart showing a method for re-partitioning reusable undo storage space by de-allocating unused space according to one embodiment.
Figure 7:
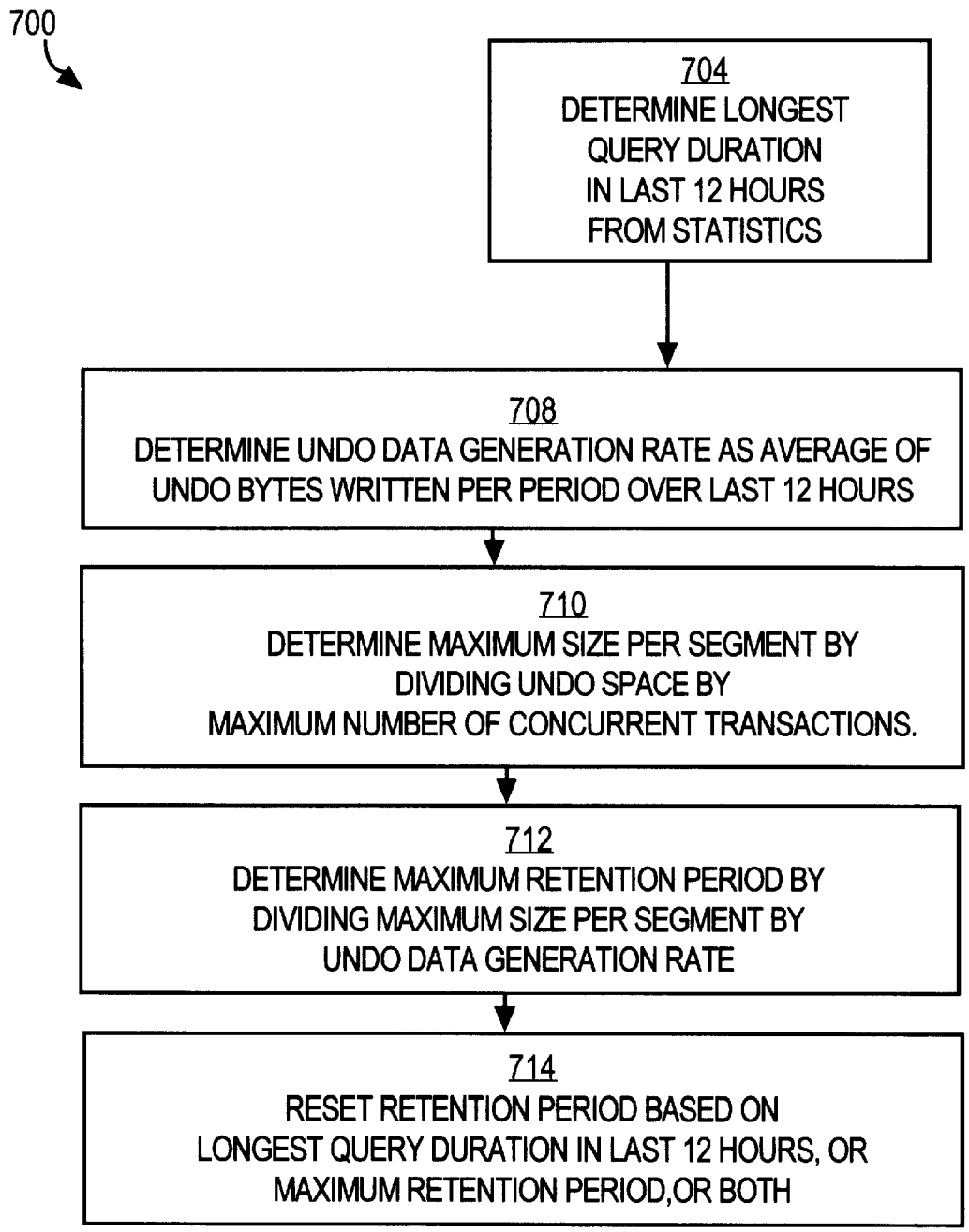
FIG. 7 is a flow chart showing a method for changing the period for retaining data after a transaction has completed according to an embodiment.

Other embodiments that use statistics to re-partition the undo storage space are described in more detail in the next sections with reference to FIG. 6 and FIG. 7.

Reducing Unused Segments

FIG. 6 is a flow chart showing a method 600 for re-partitioning reusable undo storage space by de-allocating unused space based on usage statistics according to one embodiment. The embodiment illustrated in FIG. 6 provides for retaining undo data in a segment for at least a retention period after the transaction terminates. In another embodiment, which does not provide for retaining data in the segment for at least a retention period, an inactive extent is considered an expired extent. Such an embodiment is equivalent to the illustrated embodiment when the retention period is set to zero.

The methods described above are employed to form and grow segments by allocating extents to segments. These methods gradually consume all the free extents. When all free extents are gone, the above methods search for and steal unused extents in other segments. The search and steal operations consume more computer processing resources than are consumed by allocating free extents. Thus method 600 achieves some efficiency by increasing the number of free extents by de-allocating from one or more segments those unused extents most likely to be superfluous for the segment. Method 600 employs the usage statistics accumulated in step 500 to determine which extents are most likely superfluous and which segments are most rarely used.

Determining which extents to de-allocate, and then performing the de-allocation, also consume processing resources of the computer system. To reduce such processing, these steps are taken periodically in intervals. In some embodiments, the interval is set during configuration. An appropriate value can be determined through routine experimentation. In an example embodiment, the shrinking interval is set to 12 hours. In other embodiments the interval can be predetermined in other ways, such as by storing values in a file read during execution of an instance.

Step 610 represents a decision point in which it is determined whether to shrink segments. If it is determined in step 610 that it is not time to shrink the size of segments, then control cycles back to step 610 until it is time to shrink segments. If it is determined in step 610 that it is time to shrink the size of segments, then control passes to step 612 to determine the maximum concurrent transactions and average transaction size during the most recent shrinking analysis period interval based on the statistics accumulated. Here, transaction size refers to the number of bytes of undo records generated by the transaction.

In an example embodiment, the shrinking analysis period is 12 hours. Thus the maximum number of concurrent transactions observed is the maximum value M2 of Statistic-3 in the most recent 72 periods of the series of 144 periods. In this example embodiment M2 is 9. The average transaction size is derived from Statistic-1 and Statistic-2. As described above, Statistic-1 provides the sum of undo bytes written during each period and Statistic-2 provides the sum of transactions started during each period. The number N1 of undo bytes written in the last 12 hours is obtained by summing the values of Statistic-1 for the most recent 72 periods of the series of 144 periods. The number N2 of transactions started in the last 12 hours is obtained by summing the values of Statistic-2 for the most recent 72 periods of the series of 144 periods. The average transaction size N3 is computed as N1 divided by N2. In this example embodiment, N1 is 100 Megabytes of undo records written in the most recent 12 hours and N2 is 10,000 transactions started in the most recent 12 hours. Thus the average transaction size in this example embodiment is 10 kilobytes.

Each segment is reviewed to determine if the segment should be shrunk based on its size and use compared to the values of M2 and N3. In this embodiment, the information in the bitmap data structure (115 in FIG. 1B) is used to determine the number and order of segments in the undo storage space (110 in FIG. 1B). In step 614 the next segment is made the current segment for purposes of review. The first time step 614 is performed, the first segment in the bitmap data structure (115 in FIG. 1B) is made the current segment. Control then passes to step 616.

In step 616, it is determined whether the current segment size is greater than the average transaction size N3. If not, the segment is not considered a favorable candidate for shrinking; and control passes to step 618 and 614 to make the next segment the current segment. Step 618 first determines whether any other segments remain in the undo storage space, such as by determining whether the current segment is the last segment in the bitmap data structure. If no other segments remain, shrinking is completed; and control passes back to step 610 to determine whether it is time to shrink segments again.

In other embodiments, other comparisons can be made to determine whether the segment is a favorable candidate for shrinking. For example, the segment size can be compared to half the average transaction size; and the segment can be considered a candidate for shrinking if the segment size is more than half the average transaction size.

If it is determined in step 616 that the segment is a favorable candidate for shrinking, then control passes to step 620 and following steps to determine which extents can be de-allocated to shrink the segment.

In step 620, it is determined whether an extent that has expired is allocated to the segment, such as by checking the extent map. If not, the segment is no longer a candidate for shrinking; and control passes.to step 618 to determine if there is another segment to consider.

If an expired extent is allocated to the segment, then control passes to step 622 to determine whether de-allocating another expired extent makes the segment a candidate for deletion altogether. In step 622, it is determined whether the number of extents still allocated to the current segment exceed a minimum number of extents established for every segment. For example, the minimum number of extents established for every segment in the embodiment described above is two. If more than the minimum are allocated, then the extent can be de-allocated while retaining the segment; and control passes to step 624.

In step 624 the expired extent is de-allocated from the current segment and returned to the system as a free extent. The extent is removed from the extent map and the bitmap data structure is updated. Control then passes to step 620 to determine whether another expired extent is allocated to the current segment.

If it is determined in step 622 that the segment has only the minimum number of segments then control passes to step 626. For example, if the segment has only two extents, the segment should not be shrunk further unless it is deleted entirely.

In step 626 it is determined whether to delete the segment. If not, control passes to step 618 to move on to the next segment, if any. If it is determined to delete the segment, control passes to step 630 to delete the segment.

In step 626, the segment is not deleted if the any remaining extent allocated to the segment is unexpired. If any remaining extent is unexpired, then control passes directly to step 618. It is also determined in step 626 whether deleting the segment will reduce the number of segments below the recent maximum number of transactions, M2. For example, it is determined whether the current number of segments is greater than 9, the maximum for the most recent 12 hours derived from the statistics of usage as described above. If the current number is greater than M2, control passes to step 630 to delete the segment. However, if the current number of segments is less than or equal to M2, the segment is not deleted and control passes to step 618 to determine whether any segments remain to be reviewed.

In step 630, the segment is deleted. All extents allocated to the segment become free extents, including the first extent with the transaction table and extent map. The bitmap data structure for the undo storage space is updated.

According to the method 600, system performance and efficiency are improved by increasing the number of free extents by de-allocating from one or more segments those unused extents most likely to be superfluous for the segment. Method 600 employs the usage statistics accumulated in step 500 to determine which extents are most likely superfluous and which segments are most rarely used.

In other embodiments, other statistics are employed to indicate accumulated usage of the resource over time, and other decisions are made about how to shrink segments based on these statistics. For example, the standard deviation of the transaction size can be employed to determine how large segments should be to accommodate some percentage of the expected transactions, such as 75% or 25% of the expected transactions. Alternatively, the standard deviation can be used to shrink different segments to different sizes to reflect the distribution of expected transaction sizes.

Changing Retention Period

FIG. 7 is a flow chart showing a method 700 for changing the retention period based on usage data according to an embodiment. As stated above, reasons for changing the retention period include correcting unintentionally large retention periods. Another reason for changing the retention period is that the value of the retention period affects the consumption of computer system resources; and changing the retention period can mitigate such consumption. For example, the larger the retention time the more undo storage space is consumed by the same number of transactions. This also increases the average size of segments, which causes the segments to consume more valuable cache space, and which leads to more frequent input and output operations.

Determining to change the retention period also consumes processing resources of the computer system. Therefore changes to the retention period are made irregularly. If it is determined that it is time to check the retention period, then control passes to step 704 to compare the retention time to, the statistic indicating the longest running query recently observed. If the retention period is substantially greater than the longest running query observed recently, then the retention time can be shortened. If the retention period is substantially less, then the retention time should be increased. For example, in step 704, the longest running query observed during an analysis period of the most recent 12 hours is derived from values for Statistic-4 in the 72 most recent ten-minute periods of the series of 144 ten-minute periods of time. Q1 is the largest of the 72 values of Statistic-4 in the 72 most recent periods. The retention period is compared to Q1 in step 704. In an example embodiment, Q1 is 2.4 hours and the retention period is 1 hour.

Control then passes to step 708 and following steps to estimate the impact of retention time on the average size of segments. In step 708, an undo data generation rate is determined based on the average value of Statistic-1 over the analysis period. As described above, Statistic-1 provides the sum of undo bytes written during each period. The average for the analysis period G1 is obtained by summing the undo bytes for all the periods in the analysis period and dividing by the analysis period. In this example, 12 hours is the analysis period and 100 Megabytes is the number of bytes written over 12 hours; so G1 is 8.3 Megabytes per hour.

In step 710, a maximum safe size S1 per segment is determined based on Statistic-3 over the analysis period and the total undo storage space. As described above, Statistic-3 provides the maximum number of concurrent transactions during each period. In this example, 12 hours is the analysis period, nine is the maximum number M2 of transactions during the analysis period, and 90 Megabytes is the total undo storage space; so S1 is ten Megabytes maximum size per segment.

In step 712, the maximum safe retention period R1 is obtained by dividing the maximum safe size per segment S1 by the undo data generation rate G1. In this example, S1 is ten Megabytes and G1 is 8.3 Megabytes; so the maximum safe retention time R1 is 1.2 hours. The value of R1 indicates that a retention time can be as large as this value for all nine concurrent transactions before consuming all the undo storage space.

In step 714, the retention period is reset based on the longest query during the analysis period, the maximum safe retention period or both. In the example embodiment the current retention period is 1 hour, the longest running query is 2.4 hours, and the maximum safe retention period is 1.2 hours. In one embodiment, the system automatically selects the maximum safe retention period of 1.2 hours and sends a message to a database administrator that more undo storage space is needed to guarantee retention times as long as the longest observed query, 2.4 hours.

At the undo generation rate of 8.3 Megabytes per hour, 9 segments each retaining data for at least 2.4 hours consume 180 Megabytes of storage space just for retained data. Additional storage is needed for the undo data that belongs to active transactions, though that amount is relatively small. In the example embodiment, the 100 Megabytes of undo records are generated by 10,000 transactions in 12 hours. This indicates only 10 kilobytes per active transaction. The nine segments average one transaction at a time (since there is maximum number of nine concurrent transactions observed in the interval), so each transaction uses an additional ten kilobytes of storage. Total undo storage space is just nine times that, i.e. 900 kilobytes—less than one Megabyte. This is negligible compared to the 180 Megabytes consumed for retaining undo data for 2.4 hours.

In another embodiment of step 714, the database administrator is presented with the values of the current retention period, the maximum safe retention period and the longest running query, and allowed to 1) select one, 2) input a value for the new retention time, or 3) choose to leave the retention period unchanged.

According to the method 700, system performance and efficiency are improved by changing the retention period. Method 700 employs the usage statistics accumulated in step 500 to determine the effects of a change in retention period on consumption of computer system resources.

In other embodiments, other statistics are employed to indicate accumulated usage of the resource over time, and other decisions are made about how and when to change retention period based on these statistics.

Hardware Overview

Figure 8:
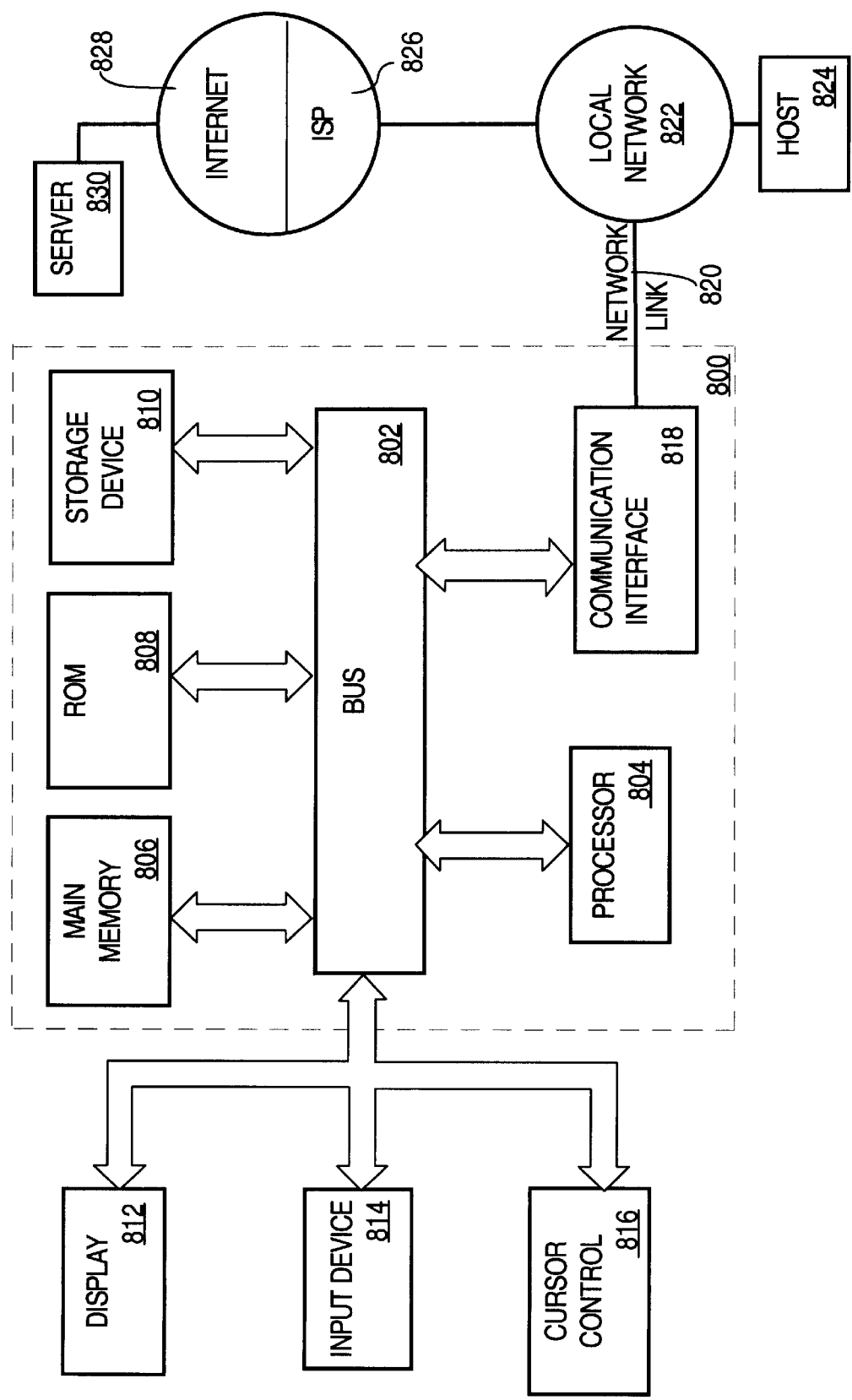
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing, within a computer system, a resource that is reusable by a plurality of entities, the method comprising the steps of:
    establishing a minimum period of time for retaining an amount of the resource after completion of use of the resource by an entity;
    allocating a first amount of the resource to a first entity of the plurality of entities; and
    after allocating the first amount to the first entity, preventing the first amount from being allocated to a second entity of the plurality of entities before the minimum period of time expires after the first entity completes use of the first resource.

2. The method of claim 1 wherein the minimum period of time is the minimum period of actual time.

3. The method of claim 1 wherein:
    the plurality of entities is associated with a software system; and
    the step of establishing the minimum period is performed during configuration of the software system.

4. The method of claim 1, wherein:
    the step of allocating the first amount to the first entity further comprises storing first data indicating that the first amount of the resource is for use by the first entity;
    the method further comprises storing second data in association with the first data, the second data indicating an actual time when use of the first amount by the first entity is completed; and
    the step of preventing the first amount from being allocated to the second entity includes preventing the first amount from being allocated to the second entity until a time period at least as long as the minimum period of time has elapsed from the actual time indicated by the second data.

5. The method of claim 4, wherein:
    the second data indicates a null time before the first entity completes use of the first amount of the resource;
    the method further comprises the step of determining whether the second data indicates a null time; and
    the first amount is allocated to the second entity only after determining that the second data does not indicate a null time.

6. The method of claim 4, wherein:
    the resource is storage space; and
    the first amount of the resource comprises a plurality of blocks of storage, a block of storage having a size for a smallest amount of data moved between a storage medium and a main memory of the computer system.

7. The method of claim 4, wherein:
    the resource is storage space; and
    the first amount of the resource comprises an extension for a file for storing temporary data generated by the first entity.

8. The method of claim 1, wherein:
    the method further comprises establishing a different minimum period of time before said step of allocating the first amount of the resource to the first entity; and
    said step of establishing the minimum period of time comprises changing to the minimum period of time from the different minimum period of time after said step of allocating the first amount of the resource to the first entity.

9. The method of claim 8, wherein said step of establishing the minimum period of time comprises changing to the minimum period of time from the different minimum period of time based on data indicating usage of the resource.

10. The method of claim 1, wherein the first amount of the resource is a first amount of storage space.

11. The method of claim 10, wherein the first entity is a first transaction that causes changes to a first set of data.

12. The method of claim 11, wherein the step of allocating the first amount of storage space comprises allocating the first amount of storage space to store information that indicates how to remove the changes made by the first transaction to the first set of data.

13. The method of claim 1, further comprising the steps of:
    determining whether all of the resource has been allocated; and
    if all of the resource has not been allocated, then performing said step of preventing the first amount from being allocated to the second entity before the minimum period of time expires after the first entity completes use of the first resource, and
    if all of the resource has been allocated, then preventing the first amount from being allocated to the second amount before the first entity completes use of the first resource.

14. A method for managing changes in a computer system, the method comprising the steps of:
    when a first entity makes changes in a computer system, durably storing, in a first storage space, first information about how to remove the changes made by the first entity; and
    after the first entity has terminated, retaining the first information in the first storage space for a time based on a specified minimum amount of time.

15. The method of claim 14, wherein the specified minimum amount of time is a period of actual time.

16. The method of claim 14, said step of durably storing first information further comprising the step of storing with the first information data indicating an actual time when the first entity is terminated.

17. The method of claim 14, further comprising the steps of:
    durably storing, in a second storage space, second information including data indicating the first storage space and the first entity; and
    when the first entity terminates, storing in the second storage space data indicating an actual time when the first entity terminates.

18. The method of claim 17, wherein the first storage space comprises a plurality of storage blocks, each storage block storing a smallest amount of data moved between a storage medium of the computer system and a main memory of the computer system.

19. The method of claim 18, wherein the plurality of storage blocks are contiguous in the storage medium.

20. The method of claim 14, said retaining the first information further comprising:
- when a second entity makes changes in the computer system at a first time, determining whether the first time is after a third time when the first entity has terminated by at least the specified minimum amount of time; and
- if the first time is after the third time, then durably storing in the first storage space, second information about how to remove the changes made by the second entity.

21. The method of claim 17, said retaining further comprising the steps of:
- when a second entity makes changes in the computer system at a first time, retrieving from the second storage space the data indicating the actual time when the first entity terminates;
- determining whether the first time is after the actual time when the first entity terminates by at least the specified minimum amount of time; and
- if the first time is after the actual time when the first entity terminates by at least the specified minimum amount of time, then
  - durably storing, in the second storage space, third information including data indicating the first storage space and the second entity, and
  - durably storing, in the first storage space, fourth information about how to remove the changes made by the second entity.

22. The method of claim 14, said step of retaining the first information in the first storage space further comprising retaining the first information in the first storage space until an earlier time of the specified minimum amount of time after the first entity has terminated, and a time when substantially all storage space for managing changes in the computer system has been consumed.

23. A method for managing changes in a computer system, the method comprising the steps of:
- when a first entity makes changes in a computer system, durably storing, in a first storage space, first information about how to remove the changes made by the first entity;
- durably storing, in a second storage space, second information including data indicating the first storage space and the first entity;
- when the first entity terminates, storing in the second storage space data indicating an actual time when the first entity terminates; and
- after the first entity has terminated, retaining the first information in the first storage space for a time based on a specified minimum amount of actual time, said retaining comprising,
  - when a second entity makes changes in the computer system at a first time, retrieving from the second storage space the data indicating the actual time when the first entity terminates,
  - determining whether the first time is after the actual time when the first entity terminates by at least the specified minimum amount of actual time; and
  - if the first time is after the actual time when the first entity terminates by at least the specified minimum amount of actual time, then
    - durably storing, in the second storage space, third information including data indicating the first storage space and the second entity, and
    - durably storing, in the first storage space, fourth information about how to remove the changes made by the second entity.

24. A computer-readable medium carrying instructions for managing, within a computer system, a resource that is reusable by a plurality of entities, the instructions for causing one or more processors to perform the steps of:
- establishing a minimum period of time for retaining an amount of the resource after completion of use of the resource by an entity;
- allocating a first amount of the resource to a first entity of the plurality of entities; and
- after allocating the first amount to the first entity, preventing the first amount from being allocated to a second entity of the plurality of entities before the minimum period of time expires after the first entity completes use of the first resource.

25. The computer-readable medium of claim 24 wherein the minimum period of time is the minimum period of actual time.

26. The computer-readable medium of claim 24 wherein:
- the plurality of entities is associated with a software system; and
- the step of establishing the minimum period is performed during configuration of the software system.

27. The computer-readable medium of claim 24, wherein:
- the step of allocating the first amount to the first entity further comprises storing first data indicating that the first amount of the resource is for use by the first entity;
- the instructions further cause the one or more processors to perform the step of storing second data in association with the first data, the second data indicating an actual time when use of the first amount by the first entity is completed; and
- the step of preventing the first amount from being allocated to the second entity includes preventing the first amount from being allocated to the second entity until a time period at least as long as the minimum period of time has elapsed from the actual time indicated by the second data.

28. The computer-readable medium of claim 27, wherein:
- the second data indicates a null time before the first entity completes use of the first amount of the resource;
- the instructions further cause the one or more processors to perform the step of determining whether the second data indicates a null time; and
- the first amount is allocated to the second entity only after determining that the second data does not indicate a null time.

29. The computer-readable medium of claim 27, wherein:
- the resource is storage space; and
- the first amount of the resource comprises a plurality of blocks of storage, a block of storage having a size for a smallest amount of data moved between a storage medium and a main memory of the computer system.

30. The computer-readable medium of claim 27, wherein:
- the resource is storage space; and
- the first amount of the resource comprises an extension for a file for storing temporary data generated by the first entity.

31. The computer-readable medium of claim 24, wherein:
- the instructions further cause the one or more processors to perform the step of establishing a different minimum period of time before said step of allocating the first amount of the resource to the first entity; and
- said step of establishing the minimum period of time comprises changing to the minimum period of time from the different minimum period of time after said step of allocating the first amount of the resource to the first entity.

32. The computer-readable medium of claim 31, wherein said step of establishing the minimum period of time comprises changing to the minimum period of time from the different minimum period of time based on data indicating usage of the resource.

33. The computer-readable medium of claim 24, wherein the first amount of the resource is a first amount of storage space.

34. The computer-readable medium of claim 33, wherein the first entity is a first transaction that causes changes to a first set of data.

35. The computer-readable medium of claim 34, wherein the step of allocating the first amount of storage space comprises allocating the first amount of storage space to store information that indicates how to remove the changes made by the first transaction to the first set of data.

36. The computer-readable medium of claim 24, the instructions further causing the one or more processors to perform the steps of:

determining whether all of the resource has been allocated; and if all of the resource has not been allocated, then performing said step of preventing the first amount from being allocated to the second entity before the minimum period of time expires after the first entity completes use of the first resource, and if all of the resource has been allocated, then preventing the first amount from being allocated to the second amount before the first entity completes use of the first resource.

37. A computer-readable medium carrying instructions for managing changes in a computer system, the instructions causing one or more processors to perform the steps of:

when a first entity makes changes in a computer system, durably storing, in a first storage space, first information about how to remove the changes made by the first entity; and after the first entity has terminated, retaining the first information in the first storage space for a time based on a specified minimum amount of time.

38. The computer-readable medium of claim 37, wherein the specified minimum amount of time is a period of actual time.

39. The computer-readable medium of claim 37, said step of durably storing first information further comprising the step of storing with the first information data indicating an actual time when the first entity is terminated.

40. The computer-readable medium of claim 37, the instructions further causing the one or more processors to perform the steps of:

durably storing, in a second storage space, second information including data indicating the first storage space and the first entity; and when the first entity terminates, storing in the second storage space data indicating an actual time when the first entity terminates.

41. The computer-readable medium of claim 40, wherein the first storage space comprises a plurality of storage blocks, each storage block storing a smallest amount of data moved between a storage medium of the computer system and a main memory of the computer system.

42. The computer-readable medium of claim 41, wherein the plurality of storage blocks are contiguous in the storage medium.

43. The computer-readable medium of claim 37, said step of retaining the first information further comprising:

when a second entity makes changes in the computer system at a first time, determining whether the first time is after a third time when the first entity has terminated by at least the specified minimum amount of time; and if the first time is after the third time, then durably storing in the first storage space, second information about how to remove the changes made by the second entity.

44. The computer-readable medium of claim 40, said step of retaining further comprising the steps of:

when a second entity makes changes in the computer system at a first time, retrieving from the second storage space the data indicating the actual time when the first entity terminates;

determining whether the first time is after the actual time when the first entity terminates by at least the specified minimum amount of time; and if the first time is after the actual time when the first entity terminates by at least the specified minimum amount of time, then durably storing, in the second storage space, third information including data indicating the first storage space and the second entity, and durably storing, in the first storage space, fourth information about how to remove the changes made by the second entity.

45. The computer-readable medium of claim 37, said step of retaining the first information in the first storage space further comprising retaining the first information in the first storage space until an earlier time of the specified minimum amount of time after the first entity has terminated, and a time when substantially all storage space for managing changes in the computer system has been consumed.

* * * * *